US008890369B2

(12) United States Patent
Baarman et al.

(10) Patent No.: US 8,890,369 B2
(45) Date of Patent: Nov. 18, 2014

(54) INDUCTIVE POWER SUPPLY

(71) Applicant: Access Business Group International LLC, Ada, MI (US)

(72) Inventors: David W. Baarman, Fennville, MI (US); William T. Stoner, Jr., Ada, MI (US); Matthew J. Norconk, Grand Rapids, MI (US); Colin J. Moore, Grand Rapids, MI (US); Joshua K. Schwannecke, Grand Rapids, MI (US); Thomas Jay Leppien, Grand Haven, MI (US); Richard J. Weber, Grand Haven, MI (US); Ryan D. Schamper, Grand Haven, MI (US)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 13/719,963

(22) Filed: Dec. 19, 2012

(65) Prior Publication Data
US 2013/0113423 A1    May 9, 2013

Related U.S. Application Data

(62) Division of application No. 12/652,077, filed on Jan. 5, 2010, now Pat. No. 8,373,310.

(60) Provisional application No. 61/142,654, filed on Jan. 6, 2009.

(51) Int. Cl.
| H02J 17/00 | (2006.01) |
| H02J 7/00 | (2006.01) |
| H01F 38/14 | (2006.01) |
| H02J 7/02 | (2006.01) |

(52) U.S. Cl.
CPC ............... *H02J 17/00* (2013.01); *H01F 38/14* (2013.01); *H02J 7/0042* (2013.01); *H02J 7/025* (2013.01)
USPC ............................. 307/104; 307/11; 320/108

(58) Field of Classification Search
CPC .................................. H04B 5/00; H02J 17/00
USPC ............................................................ 307/104
See application file for complete search history.

(56) References Cited

U.S. PATENT DOCUMENTS

| 723,836 A | 3/1903 | Cowing | |
| 2,532,685 A * | 12/1950 | Walker | ......................... 359/696 |

(Continued)

FOREIGN PATENT DOCUMENTS

| DE | 10 2005 058 636 | 6/2007 |
| EP | 0 642 203 | 7/1994 |

(Continued)

OTHER PUBLICATIONS

International Search Report, International Application No. PCT/US2010/020064, filing date Jan. 5, 2010.

*Primary Examiner* — Rexford Barnie
*Assistant Examiner* — Toan Vu
(74) *Attorney, Agent, or Firm* — Warner Norcross & Judd LLP

(57) ABSTRACT

In one aspect, the present invention provides a wireless power supply having a plunger for mechanically interconnecting a remote device with the power supply. The plunger may be extendable/retractable to interfit with the remote device. In a second aspect, the present invention provides a wireless power supply with a movable primary that allows for close alignment between the primary and the secondary when the remote device is disposed within a range of different positions with respect to the charging surface. The movable primary may, for example, be coupled to the remote device by a peg, a plunger or a magnet. Alternatively, the position of the movable primary may be adjusted manually. In a third aspect, the present invention provides a charging bowl having a plurality of charging stations disposed about a common axis. Each charging station may include a movable primary that permits some freedom in positioning of the remote device on the charging surface. In a fourth aspect, the present invention provides a wireless power supply having a manually movable primary.

13 Claims, 27 Drawing Sheets

(56) References Cited

U.S. PATENT DOCUMENTS

| | | | |
|---|---|---|---|
| 4,336,518 | A | 6/1982 | Holce et al. |
| 4,351,996 | A | 9/1982 | Kondo et al. |
| 4,538,214 | A | 8/1985 | Fisher et al. |
| 5,498,948 | A | 3/1996 | Bruni et al. |
| 5,550,452 | A | 8/1996 | Shirai et al. |
| 5,617,003 | A * | 4/1997 | Odachi et al. .................. 320/108 |
| 5,654,621 | A | 8/1997 | Seelig |
| 5,821,731 | A | 10/1998 | Kuki et al. |
| 6,803,744 | B1 | 10/2004 | Sabo |
| 8,067,921 | B2 * | 11/2011 | Sip et al. ........................ 320/108 |
| 8,164,222 | B2 * | 4/2012 | Baarman ........................ 307/104 |
| 8,456,038 | B2 * | 6/2013 | Azancot et al. ............... 307/104 |
| 2003/0118256 | A1 | 6/2003 | Ishihara |
| 2007/0035917 | A1 | 2/2007 | Hotelling et al. |
| 2007/0042729 | A1 | 2/2007 | Baaman et al. |
| 2008/0211455 | A1 | 9/2008 | Park et al. |
| 2009/0079269 | A1 | 3/2009 | Jin |
| 2009/0079270 | A1 | 3/2009 | Jin |
| 2009/0079271 | A1 | 3/2009 | Jin |
| 2009/0079387 | A1 * | 3/2009 | Jin et al. ......................... 320/108 |
| 2009/0096413 | A1 | 4/2009 | Partovi et al. |
| 2009/0106567 | A1 | 4/2009 | Baarman |
| 2009/0153098 | A1 * | 6/2009 | Toya et al. .................... 320/108 |
| 2009/0177908 | A1 | 7/2009 | Baarman et al. |
| 2010/0156345 | A1 * | 6/2010 | Phelps, III .................... 320/108 |
| 2012/0153733 | A1 * | 6/2012 | Schatz et al. ................. 307/104 |

FOREIGN PATENT DOCUMENTS

| | | | |
|---|---|---|---|
| EP | 0 823 716 | | 8/1997 |
| GB | 778072 | | 4/1954 |
| JP | H 06-153411 | | 5/1994 |
| JP | H06-319232 | | 11/1994 |
| JP | H07-46779 | | 2/1995 |
| JP | H08-502640 | | 3/1996 |
| JP | H 09-215211 | | 8/1997 |
| JP | H10-106865 | | 4/1998 |
| JP | H10-106866 | | 4/1998 |
| JP | H10-106870 | | 4/1998 |
| JP | H10-108372 | | 4/1998 |
| JP | H10-108373 | | 4/1998 |
| JP | H10-108374 | | 4/1998 |
| JP | H10-108375 | | 4/1998 |
| JP | 2005006460 | * | 2/2005 |
| JP | 2008-109762 | | 5/2008 |
| JP | 2009-505625 | | 2/2009 |
| JP | 2009-081943 | | 4/2009 |
| JP | 2009-081945 | | 4/2009 |
| JP | 2009-081946 | | 4/2009 |
| JP | 2009-081947 | | 4/2009 |
| JP | 2009-247194 | | 10/2009 |
| JP | 2011-501633 | | 1/2011 |
| JP | 2011-501938 | | 1/2011 |
| WO | 00/54387 | | 9/2000 |
| WO | 2004/038887 | | 5/2004 |
| WO | 2009/047768 | | 4/2009 |

* cited by examiner

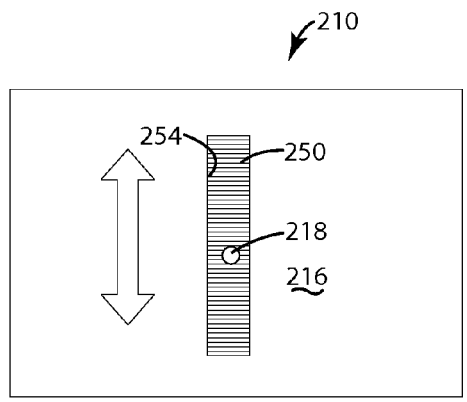
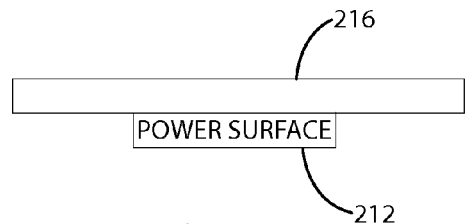
Fig. 12
Fig. 13
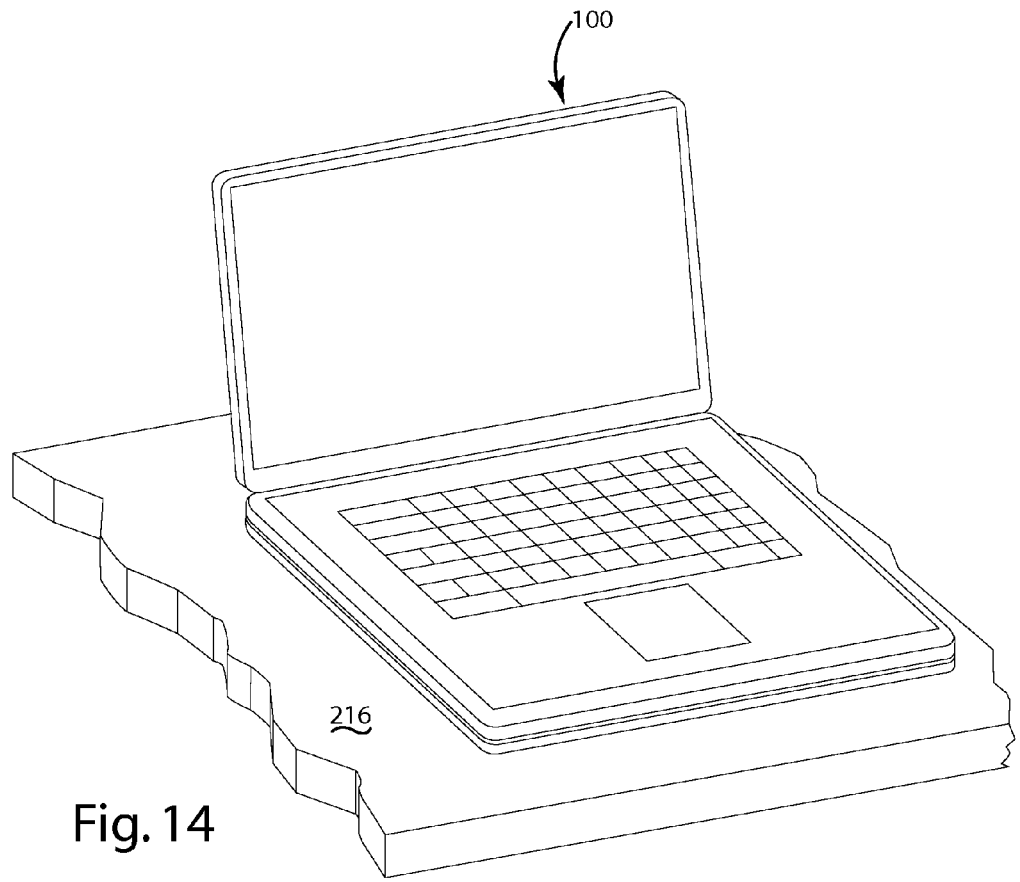
Fig. 14

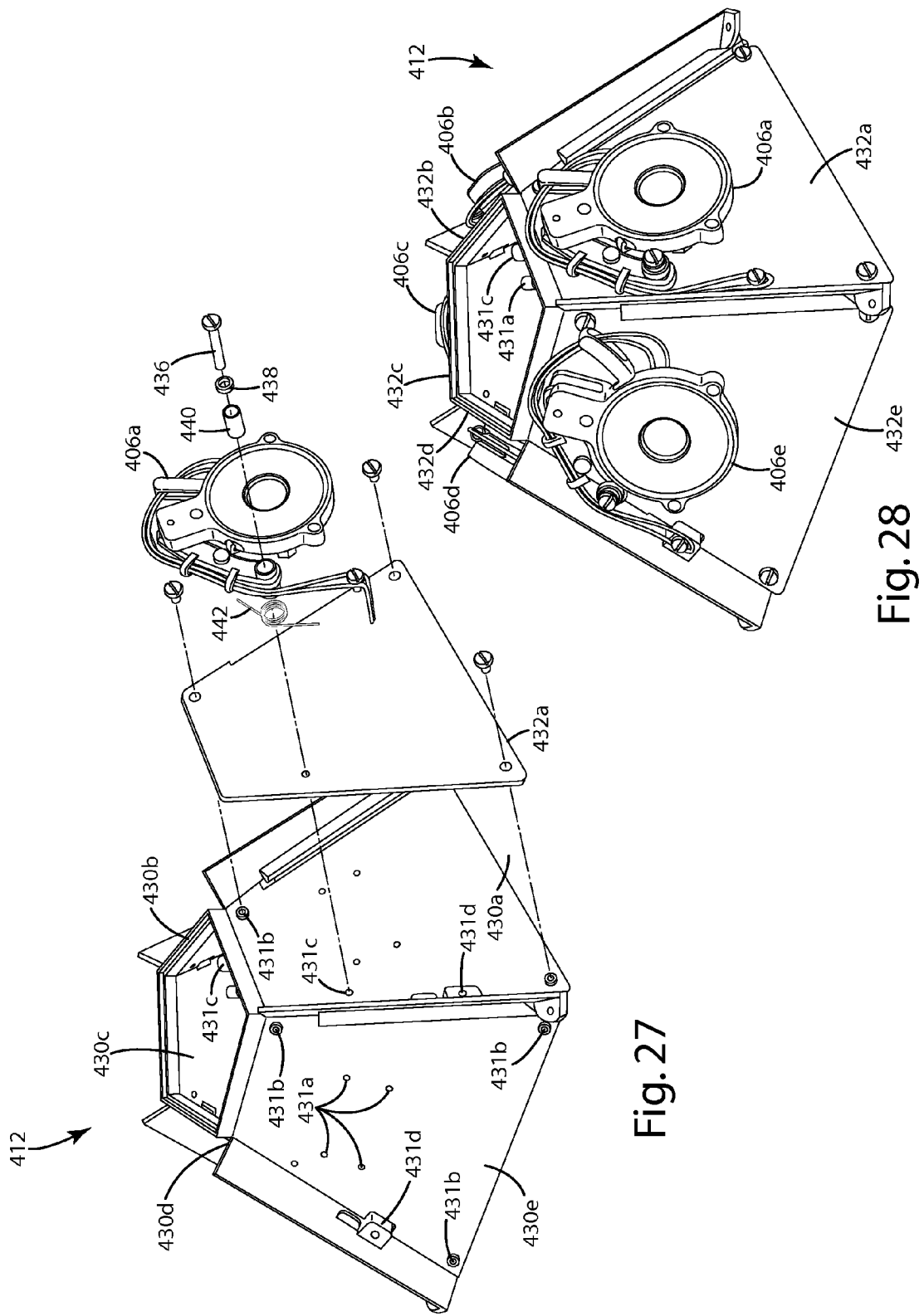

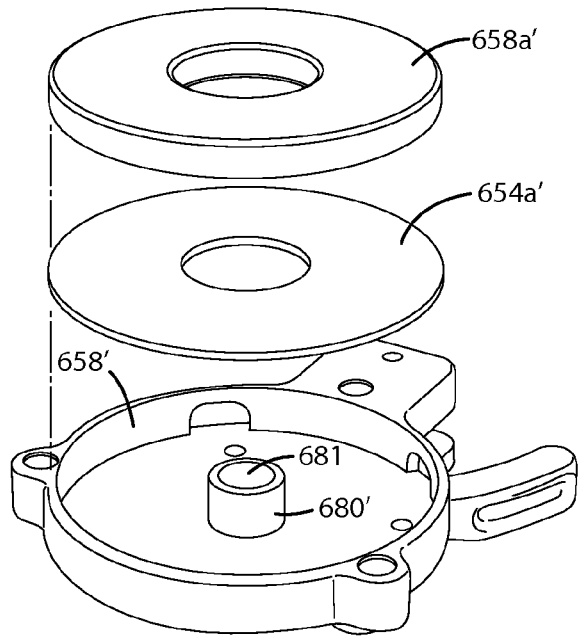
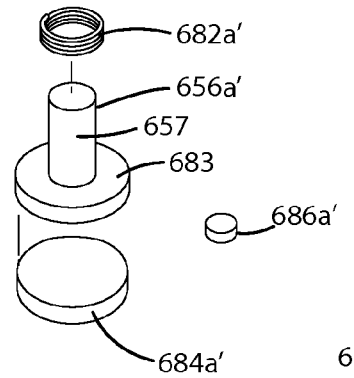
Fig. 42
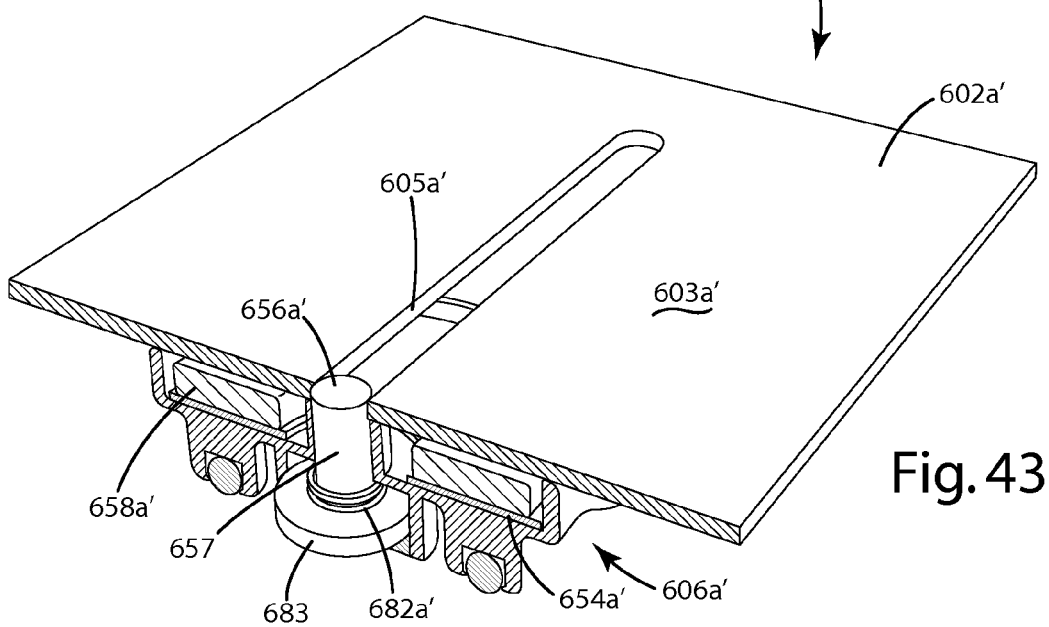
Fig. 43

INDUCTIVE POWER SUPPLY

BACKGROUND OF THE INVENTION

The present invention relates to wireless power supplies and more particularly to inductive power supplies.

With the widespread and continually growing use of portable electronics, there is an ever-increasing need for wireless power supply system that are capable of charging and/or powering electronic devices without the need for direct wired connections. Wired connections suffer from a variety of problems that make them inconvenient, burdensome and aesthetically unpleasing. Perhaps most notably, wired connections require physically plugging and unplugging the device, involve a mess of unsightly cords, require matching plugs on the cord and remote device and can only charge a single device at a time with a single cord. Further, with conventional paired chargers, a user is required to keep and store as many wired DC power supplies as devices that are owned.

Wireless power supply systems have proven to be a dramatic improvement over wired connections. Wireless power supply systems eliminate the need to connect electronic devices to power cords and therefore eliminate many of the problems associated with wired connections. Many conventional wireless power supply systems rely on inductive power transfer (i.e. the transfer of power using electromagnetic fields) to convey electrical power without wires. A typical inductive power transfer system includes an inductive power supply that uses a primary coil to wirelessly convey energy in the form of a varying electromagnetic field and a remote device that uses a secondary coil to convert the energy in the electromagnetic field into electrical power. To provide an inductive power transfer system with optimal efficiency, it is typically desirable to provide proper alignment between the primary coil and the secondary coil. Alignment is often achieved using cradles or other similar structures. For example, the primary coil may be positioned around the outside of a cup shaped receptacle to closely receive the portion of the remote device containing the secondary coil. When the remote device is placed in the cup, the two coils become closely aligned by the mechanical interfit. Although helpful in providing alignment, this approach requires deliberate placement of the remote device within the cradle and essentially precludes movement of the electronic device with respect to the power supply. It may also limit the inductive power supply to use in connection with a single device specially configured to fit within the cup or cradle. It also limits the ease of interchangeability with multiple devices containing secondary coils. The cup-shaped receptacle in the charger will, by definition, provide a close interfit with the secondary device it was designed for. However, for other devices, it may provide a loose fit or a receptacle too small to allow any fit at all.

In another conventional application, an electronic device is provided with a matching wireless charger. In this construction, the wireless charger includes a fixed peg that extends upwardly to provide a mounting structure to receive the electronic device for charging. The device defines a void configured to fit closely over the peg. In use, the device is docked on the wireless charger by placing it on the wireless charger with the void fitted over the peg. In this construction, the primary coil and the secondary coil are positioned to provide appropriate alignment when the remote device is properly docked on the wireless charger. Although this construction provides good alignment between the electronic device and its matching wireless charger, it may suffer from a variety of issues. For example, the peg is fixed and therefore does not provide any freedom of movement for the remote device. Further, the fixed peg extends from the charging surface at all times (even when a remote device is not present), thereby interfering with use of the charging surface for other purposes.

In yet another conventional application, magnets are used to draw the primary coil and secondary coil into close alignment. For example, in one conventional application, the primary coil is coupled with a primary magnet and loosely fitted within a void beneath the charging surface. When a remote device with a secondary magnet is placed on the charging surface within sufficient proximity to the primary magnet, the magnetic attraction of the primary magnet and the secondary magnet moves the primary magnet through the void into alignment with the secondary magnet. This, in turn, draws the primary coil and the secondary coil into close alignment. Although providing some improvement, the force of the magnetic attraction may not be sufficient to move the primary magnet and primary coil within the void. This is particular true when the remote device is initially placed on the charging surface in a position in which the primary magnet and the secondary magnet are not already in close alignment. Further, because the primary magnet and primary coil are permitted to move freely within the void, their location may be unknown when initially placing the remote device on the charging surface. This may make it more difficult to initially bring the two magnets together.

SUMMARY OF THE INVENTION

The present invention provides a wireless power supply having a plunger for mechanically interconnecting a remote device with the power supply. In one embodiment, the plunger is movably mounted within a charging surface between a retracted position in which the plunger may be flush with the charging surface and an extended position in which the plunger protrudes from the charging surface to interfit with the remote device. The remote device may be provided with a receptacle shaped to receive the plunger.

In one embodiment, the plunger and the remote device are fitted with magnets that cause the plunger to extend when the remote device is place in proximity to the plunger. In this embodiment, the plunger may be biased in the retracted position, for example, by a coil spring, and may extend when the magnet of the remote device is placed in sufficient proximity to the magnet within the plunger.

In one embodiment, the plunger may include a switch that activates the wireless power supply when the plunger is extended. The switch may indicate to the wireless power supply that a remote device is potentially in position to receive power. The wireless power supply may respond by awaking from a "standby" state and supplying power or attempting to confirm the presence of a valid remote device (e.g. a remote device suitable for receiving power from the wireless power supply).

In one embodiment, the primary is disposed within the plunger so that extension of the plunger brings the primary into closer alignment with the secondary. For example, the primary may be a coil of wire, such as Litz wire, fitted into the tip of the plunger. As the plunger extends, the primary coil may extend toward the remote device to provide closer alignment.

In a second aspect, the present invention provides a wireless power supply with a movable primary that allows for close alignment between the primary and the secondary when the remote device is disposed within a range of different positions with respect to the charging surface.

In one embodiment, the wireless power supply includes a plunger that is mounted in the charging surface with at least one degree of movement. In this embodiment, the primary may be interconnected with the plunger so that the primary moves with the plunger. In one embodiment, the primary is disposed coaxially with respect to the plunger. Accordingly, in use, the primary travels with the plunger to remain in close alignment with the secondary of a remote device fitted onto the plunger. The plunger may be retractable (as described above) or fixed in a position protruding from the charging surface. It should be noted that 360 degree rotation or freedom of movement around the plunger is an inherent freedom associated with this design. Wireless power would be available in any portion of the 360 degree rotation respectively.

In one embodiment, the movable primary is coupled to the remote device by one or more magnets. In this embodiment, the primary is movably mounted within the wireless power supply and is coupled to a magnet, such that movement of the magnet results in movement of the primary. In this embodiment, the remote device is fitted with a magnet that will attract the primary magnet and draw the primary into alignment with secondary when the remote device is placed within sufficient proximity. The primary/primary magnet combination may be biased in a home position. An example of a home position would be position that allows user placement and plunger engagement in a known area or region of expected motion during placement.

In one embodiment, the primary is pivotally mounted to a linkage arm that provides the primary with movement along two axes. In this embodiment, the linkage arm may be pivotally mounted to a frame at one end. The primary may be housed within a medallion that is pivotally mounted to the free end of the linkage arm. When pivotal movement of the linkage arm is combined with pivotal movement of the medallion, the primary is free to move along two axes. The linkage arm may be biased in a home position by a spring.

In a third aspect, the present invention provides a charging bowl having a plurality of charging stations disposed about a common axis. Each charging station may include an inclined charging surface that holds the remote device in an upright position and reduces the footprint that would be required to charge the same number of devices if positioned on a single plane.

In one embodiment, each charging station includes a movable primary that permit some freedom in positioning of the remote device on the charging surface. In one embodiment, the movable primary includes a plunger that mechanically couples the remote device to the primary so that the primary moves with the remote device along the charging surface. In an alternative embodiment, the movable primary and remote device include magnets that couple the primary and the remote device. The magnets may draw the primary into alignment with the secondary in the remote device and may keep the primary and secondary in alignment if the remote device is moved over the charging surface.

In one embodiment, each charging station includes separate wireless power supply circuitry. In this embodiment, the charging stations may operate essentially independently of each other. In an alternative embodiment, the charging station includes at least two charging stations that receive power from common wireless power supply circuitry. The common wireless power supply circuitry may have sufficient power to simultaneously power multiple primaries or it may alternately power the separate primaries, for example, through a multiplexing scheme.

In one aspect, the present invention provides a simple and effective mechanical structure for assisting in improved alignment between the primary of a wireless power supply and the secondary of a remote device. In those embodiments that include an extendable plunger, the plunger may be retracted when not in use and therefore not interrupt the charging surface. This can be particularly beneficial when the charging surface is a desktop or other surface that may be used for other purposes when not charging. This is also beneficial when using devices that do not accept the movement of the plunger and can remain flush. In applications where the plunger engages magnetically but cannot move the inductive link is still very functional and the feedback to the user is very positive. This attribute allows these devices to be directly interchangeable except where movement engages the power supply. Other sensing and methods can be used for interoperable surfaces. The use of magnets to extend/retract the plunger is convenient and reliable because it requires no direct user interaction. In those embodiments in which the primary is disposed within the plunger, movement of the plunger can be used to provide improved coupling and therefore improved performance. Embodiments that use movement of the plunger to activate the power supply may provide reduced power consumption because they will poll for the remote device only when the plunger has been extended. The use of a moving primary coil provides the remote device with freedom of movement when it is on the charging surface. The mechanically coupling between the remote device and the primary coil (e.g. via the plunger) provides reliable physical movement of the primary coil. In another aspect, the present invention provides a charging bowl that permits wireless powering of multiple devices in a reduced footprint. The charging bowl includes inclined charging surfaces arranged around a common axis.

These and other objects, advantages and features of the invention will be more fully understood and appreciated by reference to the description of the current embodiment and the drawings.

BRIEF DESCRIPTION OF THE DRAWINGS

FIG. 12 is a representational top view of a power supply in accordance with a third alternative embodiment.

FIG. 13 is a representational front view of the power supply of FIG. 12.

FIG. 14 is a perspective view of a remote device disposed on the power supply of FIG. 12.

FIG. 27 is a partially exploded perspective view of the charging bowl frame.

FIG. 28 is a perspective view of the charging bowl frame with all coil movement assemblies installed.

FIG. 42 is an exploded perspective view of the medallion of a coil movement assembly with an extendable/retractable plunger.

FIG. 43 is a cross sectional view taken through the retracted plunger in FIG. 34.

DESCRIPTION OF THE CURRENT EMBODIMENT

Figure 1:
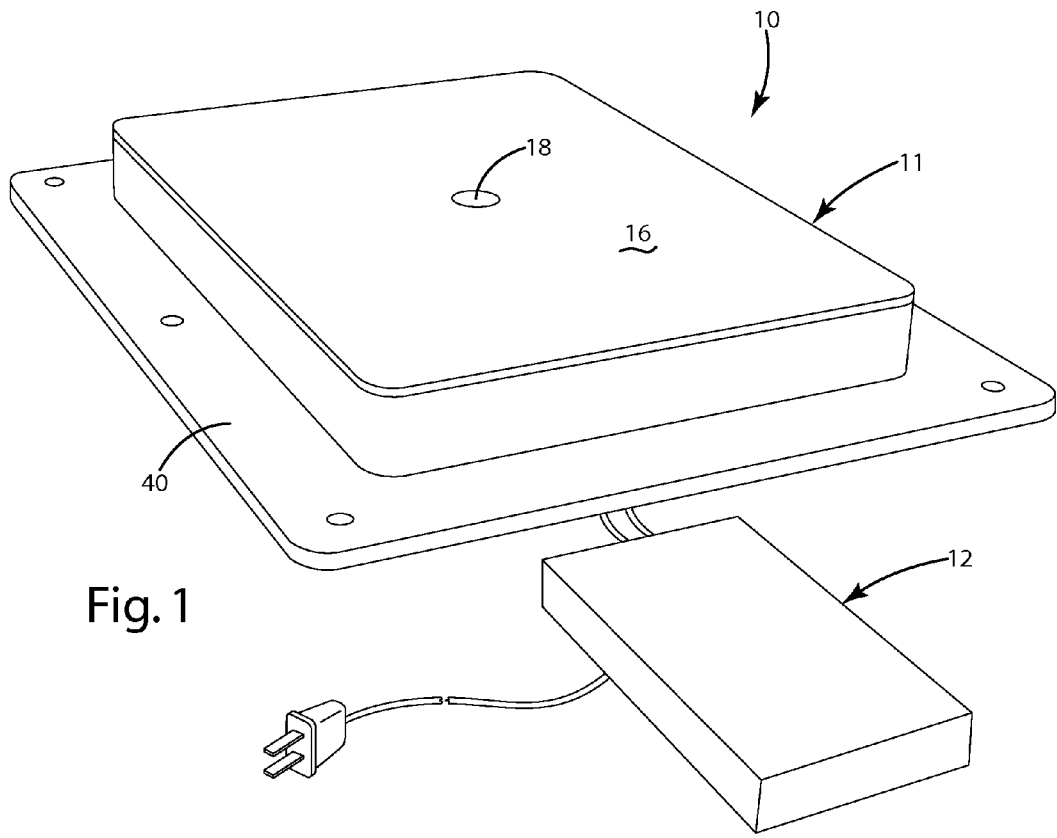
FIG. 1 is a perspective view of a wireless power supply according to an embodiment of the present invention showing the plunger in the retracted position.

A wireless power supply 10 in accordance with an embodiment of the present invention is shown in FIG. 1. The wireless power supply 10 generally includes a housing 11 containing power supply circuitry 12, including a primary 14 for generating an inductive field. The housing 12 includes a charging surface 16 upon which a remote device, such as a portable electronic device (e.g. laptop 100), can be removably placed to receive wireless charging/power. The wireless power supply 10 includes a plunger 18 disposed in the charging surface 16. The plunger 18 is extendable/retractable with respect to the charging surface 16. The plunger 18 may be extended to provide a structure to mechanically interconnect with and align a remote device, and retracted to provide a generally flush charging surface 16 when no device is placed on the wireless power supply 10. The electronic device 100 may include a socket 106 adapted to interfit with the plunger 18 (See FIG. 5). In the illustrated embodiment, the plunger 16 extends and retracts by operation of magnets contained in the plunger 18 and the electronic device 100. Although the present invention is illustrated in connection with a system configured to charge/power a laptop computer 100, the present invention is well suited for use in charging a wide variety of electronic devices, such as cellular phones, personal digital assistants, media players, remote controls, video screens, monitors and personal gaming systems, as well as other electrically powered devices, such as home electronics, kitchen appliances and tools.

As noted above, the wireless power supply 10 includes power supply circuitry 12 (See FIG. 1). The various embodiments of the present invention may incorporate essentially any wireless power supply circuitry. However, in the illustrated embodiments, the present invention incorporates eCoupled™ inductive power supply technology available from Fulton Innovations of Ada, Mich. In one embodiment, the present invention includes an adaptive inductive power supply system capable of varying the amount of power supplied by the inductive coupling based on the needs of the device or devices being powered. The adaptive inductive power supply system may have the ability to supply power to the electronic device at the correct magnitude at the beginning of operation, as well as to continually monitor the power supply circuit and make adjustments in real-time as desirable. This technology allows the power supply circuit to adapt to changes in the power requirements of the remote device. For example, the power supply circuit may have the ability to adjust characteristics, such as frequency, duty cycle and power magnitude, to accommodate different devices, including combinations of different devices, and to adjust for misalignment between the primary coil and the secondary coil. U.S. Pat. No. 6,436,299 to Baarman et al; U.S. Pat. No. 6,825,620 to Kuennen et al; U.S. Pat. No. 7,212,414 to Baarman; U.S. Publication No. 2004/0150934 to Baarman and U.S. Publication No. 2004/0130915 to Baarman are incorporated herein by reference. The present invention may include a power supply system that has the ability to identify the remote device and authenticate its ability to receive power from the power supply system. U.S. Publication No. 2007/0042729 to Baarman et al; U.S. Provisional Application No. 60/883,127 to Baarman; and U.S. Provisional Application No. 60/883,125 to Baarman are incorporated herein by reference. This technology may allow the power supply system to tune itself to operate at peak efficiency with a wide range of devices—even devices with dramatically different power requirements. Although not required, the aforementioned eCoupled™ technologies provide design flexibility and allow the system to provide power to multiple devices. The present invention may also include a multi-phase inductive power supply, such as a three-phase inductive power supply. A multi-phase inductive power supply system may improve efficiency, reduce cost and reduce heat generated by the power supply system. U.S. Provisional Application No. 60/976,137 entitled "Multiphase Inductive Power Supply System," filed on Sep. 28, 2007, by Baarman is incorporated herein by reference.

Although not illustrated in detail, the power supply circuitry 12 generally includes circuitry to convert wall power (e.g. AC mains power) to an electrical signal appropriate to generate the desired electromagnetic field. The desired electromagnetic field may vary from application to application depending in part on the power requirements of the remote devices, the characteristics of the primary and the secondary and the characteristics of the electromagnetic coupling between the power supply and the remote device. The power supply circuitry 12 may include a controller and a tank subcircuit, such as a series resonant tank subcircuit. The controller may include the circuitry and programming required to generate and apply appropriate electrical signals to the tank subcircuit so that the tank subcircuit generates the desired electromagnetic field. The tank subcircuit generally includes a capacitor and a primary. The value of capacitor may vary from application to application, for example, to adjust the resonant frequency of the tank subcircuit. The primary may be a coil of wire (e.g. Litz wire) or other circuit component capable of generating a suitable electromagnetic field in response to the power supplied to the tank subcircuit. For example, the primary may be a printed circuit board coil in accordance with U.S. Ser. No. 60/975,953, which is entitled "Printed Circuit Board Coil" and filed on Sep. 28, 2007 by Baarman et al, and which is incorporated herein by reference in its entirety. The controller may be programmed to periodically "ping" the primary coil to detect the presence of a device to be charged by measuring the reflected impedance from the primary coil. When a device is detected, the controller may turn on and drive the primary coil in accordance with its operating algorithm. The controller may also turn an indicator light (if one exists) to provide a visual indication that the controller is supplying power.

Figure 2:
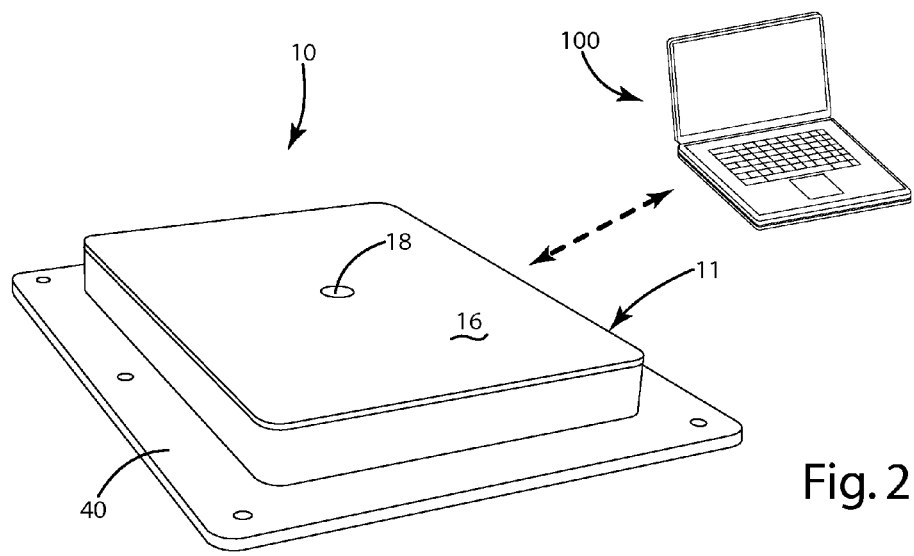
FIG. 2 is a perspective view of a wireless power supply and remote device with the plunger in the extended position.

As noted above, the wireless power supply 10 may include a housing 11. The housing 11 of the illustrated embodiment includes a charging surface 16 upon which portable electronic devices, such as laptop 100, may be removably placed to wirelessly receive power that can be use to charge and/or power the portable device. The housing 11 may be designed to recess into a work surface, such as a counter top or desktop. Alternatively, the housing 11 may be designed to function as a stand-alone device. If mounted in a work surface, the housing 11 may be installed so that the charging surface 16 is flush with the work surface. The wireless power supply 10 may also includes a plunger 18 disposed in the charging surface 16. The plunger 18 of this embodiment is extendable/retractable with respect to the charging surface 16. The plunger 18 may be extended to provide a mechanical interconnection with an electronic device (See FIG. 2), and retracted to provide a generally flush charging surface 16 when no device is placed on the wireless power supply 10 (See FIG. 1). To facilitate close alignment between the power supply 10 and the device 100, the device 100 may include a socket 106 adapted to closely interfit with the plunger 18 (See FIG. 5).

Figure 3:
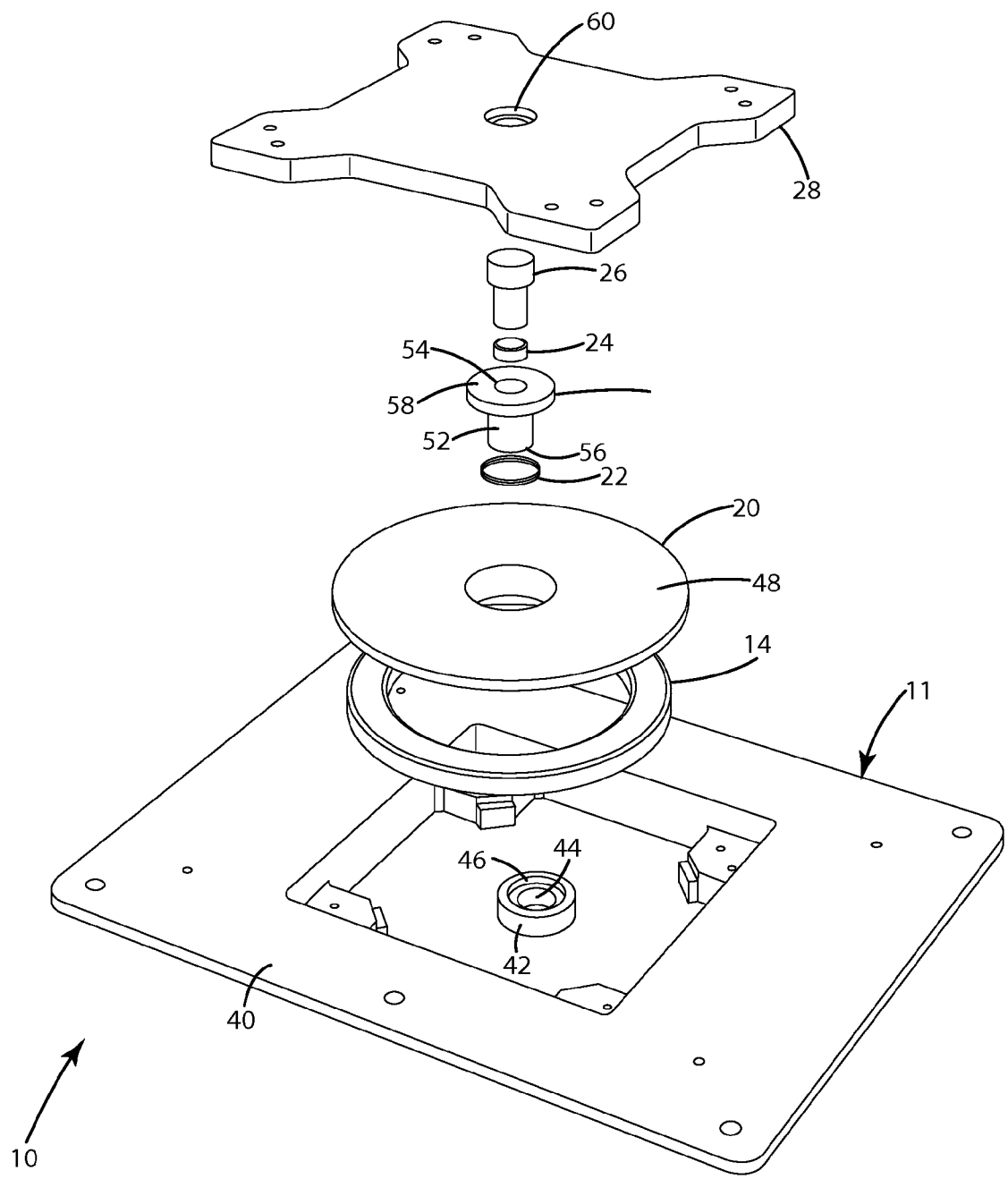
FIG. 3 is an exploded perspective view of the wireless power supply.
Figure 5:
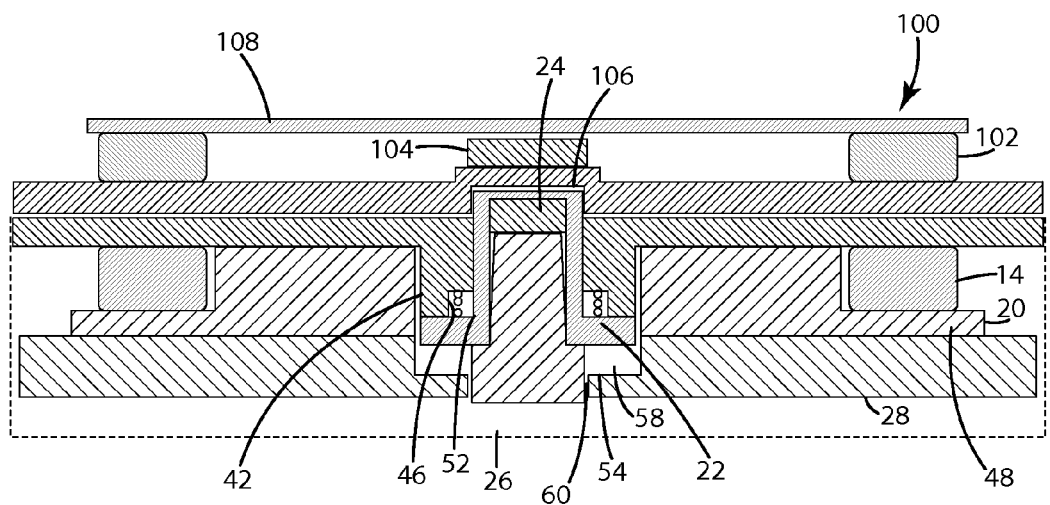
FIG. 5 is a cross-sectional view of the power supply and the remote device showing the plunger in the extended position.
Figure 6:
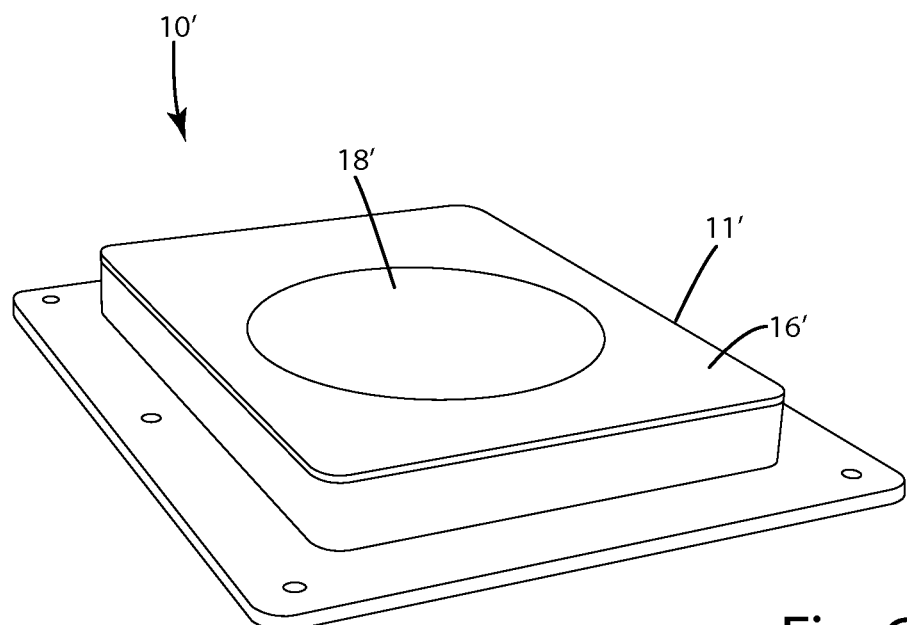
FIG. 6 is a perspective view of a first alternative power supply showing the plunger in the retracted position.
Figure 7:
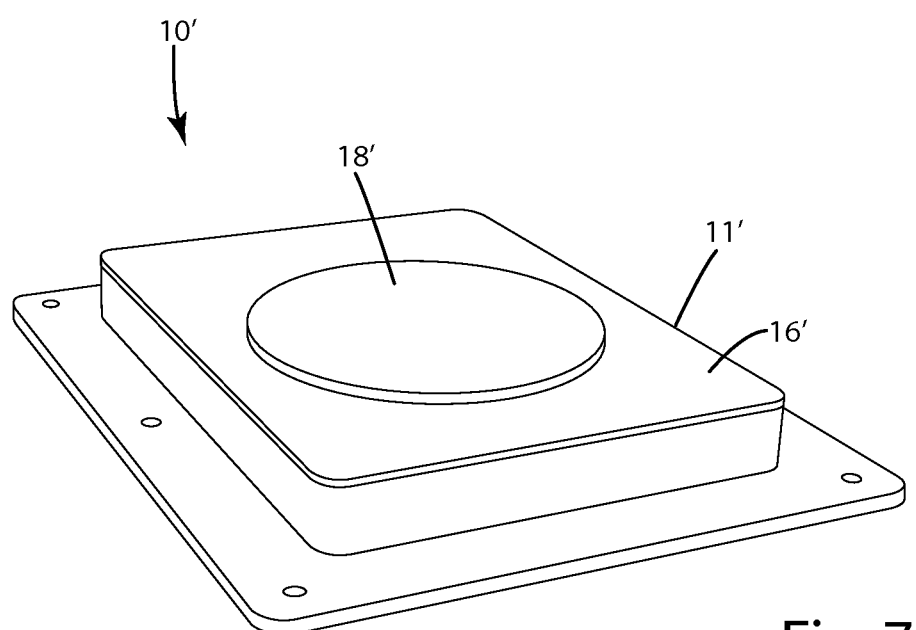
FIG. 7 is a perspective view of the first alternative power supply showing the plunger in the extended position.
Figure 8:
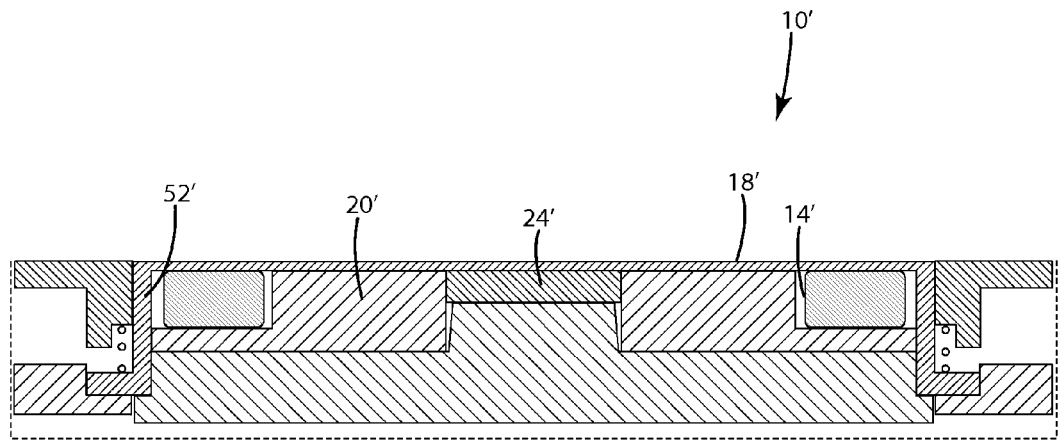
FIG. 8 is a cross-sectional view of the first alternative power supply showing the plunger in the retracted position.
Figure 9:
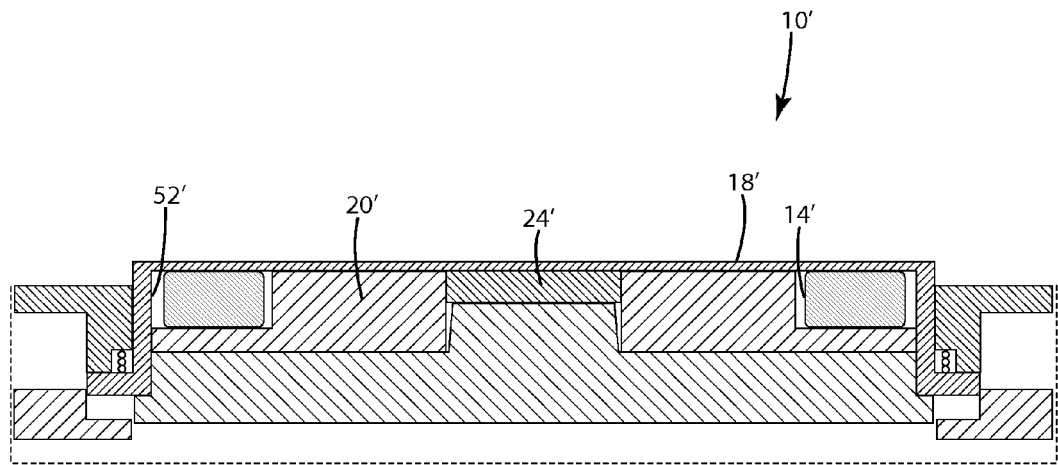
FIG. 9 is a cross-sectional view of the first alternative power supply showing the plunger in the extended position.

FIG. 3 shows an exploded bottom perspective view of a portion of the wireless power supply 10. As shown, the wireless power supply 10 includes housing 11, primary 14, a primary ferrite 20, a plunger spring 22, the plunger 18, a primary magnet 24, a plunger cap 26 and an assembly cover 28. The housing 11 may be manufactured from a wide variety of materials. For example, the housing 11 may be injected molded from plastic. The housing 11 may include a charging surface 16 and a broad flange 40 for mounting the housing 11 to a support structure, such as a desktop or countertop. In the illustrated embodiment, the housing 11 includes a plunger neck 42 that defines a central opening 44 configured to closely receive the plunger 18. The length of the plunger neck 42 may be selected to set the range of travel of the plunger 18 in the "extended" direction. The plunger neck 42 may include an inner shoulder 46 configured to receive the plunger spring 22 as described in more detail below. As shown, the inner shoulder 46 of this embodiment is of sufficient depth to receive the compressed plunger spring 22 (as shown in FIG. 5), which permits the plunger 18 to directly engage the plunger neck 42 when extended.

In this embodiment, the primary 14 is a coil of wire, such as Litz wire. The size, shape and other characteristics of the primary coil 14 may be selected to match the application. The primary coil 14 may be replaced by other types of primaries capable of generating an adequate electromagnetic field. For example, as noted above, the primary may alternatively be a printed circuit board coil, such as the printed circuit board coil disclosed in U.S. Ser. No. 60/975,953, which is entitled "Printed Circuit Board Coil".

Figure 4:
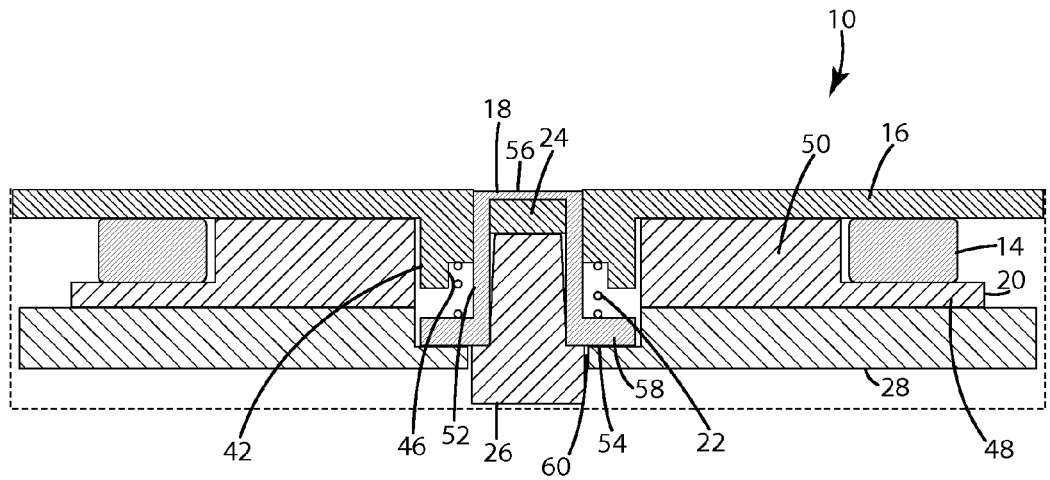
FIG. 4 is a cross-sectional view of the power supply showing the plunger in the retracted position.

The power supply 10 of the illustrated embodiment includes a primary ferrite 20 to assist in controlling the electromagnetic field generated by the primary coil 14. For example, the primary ferrite 20 is configured to shield the surrounding electronics from the electromagnetic field and also to improve the performance of the inductive coupling. The illustrated ferrite 20 is generally annular having a base 48 and a neck 50. The base 48 is configured to generally coextend with the primary 14. The neck 50 is configured to fit into the center of the primary 14, as shown in FIG. 4. The primary ferrite 20 may be manufactured from any suitable ferrite material. The size, shape and configuration of the primary ferrite may vary from application to application as desired, and may be eliminated in those applications where it is not desired. It is generally desirable to minimize the distance between the top of the primary coil and the charging surface. In the illustrated embodiment, this distance is less than approximately 0.1", but the distance may be greater in some application.

In this embodiment, the plunger spring 22 is disposed between the plunger 18 and the housing 11 to bias the plunger 18 in the retracted position. The spring 22 may be located in essentially any position capable of biasing the plunger 18 in the desired position. Although it may be essentially any component capable of applying a bias to the plunger 18, the plunger spring 22 may be a coil spring fitted concentrically over the plunger 18. If desired, the plunger spring 22 may be manufactured from plastic or other non-ferrite materials. The size, strength and other characteristics of the plunger spring 22 may vary from application to application depending on various issues, such as desired strength, durability and range of plunger motion.

The illustrated plunger 18 generally includes a hollow cylindrical body 52 with an open end 54 and a closed end 56, and a retainer flange 58 disposed at the open end 54. The closed end 56 may be squared, as shown, or it may be tapered to facilitate insertion into the socket 106 in the remote device 100. The retainer flange 58 is configured to retain the plunger 18 within the housing 11 and to interact with the plunger spring 22. The body 52 is generally annular in cross-section, but may have different cross-sections, if desired. For example, the cross-sectional shape of the body 52 may be selected to dictate specific alignment between the remote device and the plunger 18. In the illustrated embodiment, the annular cross-section permits essentially unlimited rotational freedom of the remote device about the plunger 18. As an alternative, a plunger with a square cross-section may be used to require the remote device to be placed in one of four positions. Other examples include a rectangular cross-section for two positions, a hexagon for six positions, a pentagon for five positions and an octagon for eight positions. In yet another example, a teardrop or a non-symmetrical cross-section may be used to require the remote device to be placed in a single position. In the illustrated embodiment, the power supply 10 includes a single plunger 18 to interfit with a single remote device. If desired, the power supply 10 may include two or more plungers to interfit with a single device. For example, a power supply 10 may include two plungers to interfit with two sockets is a single remote device (not shown). The two plungers may cooperate to ensure specific alignment between the power supply 10 and the remove device.

In the illustrated embodiment, the plunger 18 is actuated by magnetism. More specifically, the illustrated embodiment includes a primary magnet 24 disposed in the plunger 18 and a secondary magnet 104 disposed in the portable device 100. When the secondary magnet 104 is brought within sufficient alignment with the primary magnet 24, the magnetic attraction extends the plunger 18 into the socket 106. The primary magnet 24 of the illustrated embodiment is a disc-shaped permanent magnet that is fitted within the plunger 18. However, the primary magnet 24 may have other shapes and may be disposed in other locations where it can interact with the secondary magnet 104 to extend the plunger 18. The primary magnet 24 of the illustrated embodiment may be a permanent, rare earth magnet. It may be, however, essentially any magnet capable of providing the desired plunger 18 actuation. If desired, the primary magnet 24 may be a bonded magnet that may be less susceptible to heating in the presence of a magnetic field.

The power supply 10 of the illustrated embodiment includes a plunger cap 26 fitted concentrically into the open end of the plunger 18. The plunger cap 26 may be secured in place within the plunger 18. For example, the plunger cap 26 may be secured in place by a friction fit, snap-fit, fasteners or adhesives. Among other things, the plunger cap 26 holds the primary magnet 24 in place within the plunger 18 and interacts with the assembly cover 28 to shepherd reciprocating motion of the plunger (described in more detail below).

The assembly cover 28 is a generally planar plate configured to hold the power supply 10 components in place. The assembly cover 28 may be secured by screws (not shown) or other fasteners. The assembly cover 28 may alternatively be snap-fitted or otherwise secured to the housing 11. The assembly cover 28 of the illustrated embodiment defines a plunger opening 60 configured to slidably receive the plunger cap 26. The plunger opening 60 may closely receive the plunger cap 26 to mechanically guide movement of the plunger 18 as the plunger 18 extends or retracts.

The present invention is suitable for use in supplying power to essentially any remote device capable of receiving power wirelessly. In the illustrated embodiment, the power supply 10 generates an electromagnetic field and is therefore suitable for use in supplying power to remote devices capable of receiving power via an electromagnetic field. In some of the illustrations, the remote device 100 is shown as a laptop computer, and in other illustrations, it is shown as a generic portable electronic device. The remote device 100 includes a secondary, such as a coil of wire 102. The secondary coil 102 may have inner and outer diameters that correspond with those of the primary coil 14. As noted above, the remote device 100 defines a socket 106 that is configured to closely receive the plunger 18. The socket 106 may be squared (as shown in FIG. 5), or it may be angled at the mouth to facilitate insertion of the plunger 18. In the illustrated embodiment, the plunger 18 is configured to extend and retract through the interaction of magnets. Accordingly, the remote device 100 includes a secondary magnet 104 that, in this embodiment, is disposed adjacent to the end of socket 106. The remote device 100 may also include a secondary ferrite 108. The secondary ferrite 108 may be disc-shaped and may be of sufficient diameter to overlay the secondary coil 102. Although not shown, the remote device 100 also includes circuitry for receiving the power generated in the secondary coil 102 and for using that power to charge or power the remote device 100. Depending on the nature of the power supply circuitry 12, the remote device 100 may include more complicated circuitry, such as communications circuitry capable of communicating information used in the power supply process (e.g. power requirement information or real-time power received information) or communications circuitry capable of transferring data to and/or from the remote device.

FIGS. 4 and 5 are representational views of the power supply 10 showing the plunger 18 in the retracted position (FIG. 4) and in the extended position (FIG. 5). As shown in FIG. 4, the plunger spring 22 is fitted between the housing 11 and the retainer flange 58 of the plunger 18. The plunger spring 22 holds the plunger 18 in the retracted position until a secondary magnet 104 is brought into sufficient proximity of the plunger 18 for the attraction between the primary magnet 24 and the secondary magnet 104 to overcome the spring 22. The primary magnet 24 is disposed within the hollow center of the plunger body 52 at the closed end 56 where it is will be close to the secondary magnet 104 in the remote device 100. Referring now to FIG. 5, the remote device 100 is placed upon the charging surface 16 such that the socket 106 is aligned with the plunger 18. As shown, the attractive force between the primary magnet 24 and the secondary magnet 104 has extended the plunger 18 causing the plunger spring 22 to compress into the inner shoulder 46. The extended plunger 18 is fitted closely into the socket 106 to mechanically align the secondary coil 102 with the primary coil 14.

In an alternative embodiment shown in FIGS. 6-9, the wireless power supply 10' includes a primary 14' that is disposed within the plunger 18'. Wireless power supply 10' is essentially identical to wireless power supply 10, except as noted herein and shown in the corresponding figures. The figures show the plunger 18' contained in the housing 11' in the retracted (FIGS. 6 and 8) and extended (FIGS. 7 and 9) positions Like wireless power supply 10, the plunger 18' of wireless power supply 10' is configured to extend beyond and retract into flush alignment with the charging surface 16' using magnets. As shown, the plunger 18' includes a hollow body 52' of sufficient size to receive the primary 14'. In this embodiment, the power supply 10' may include a primary ferrite 20' and primary magnet 24' that are also fitted within the plunger 18'. The primary coil 14', primary ferrite 20' and primary magnet 24' are secured in the body 52' of the plunger 18' by plunger cap 26'.

Figure 10:
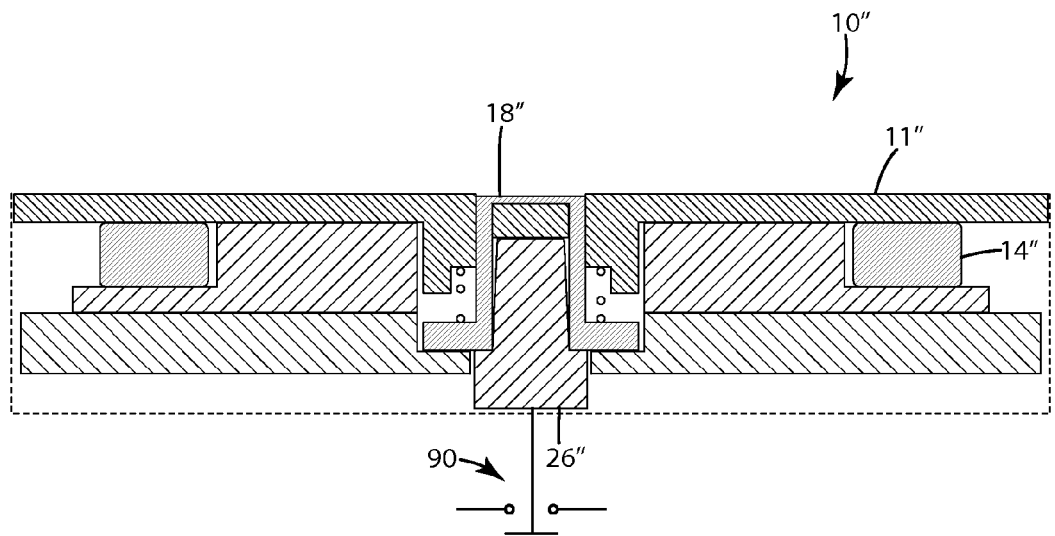
FIG. 10 is a cross-sectional view of a second alternative power supply having a normally open switch.
Figure 11:
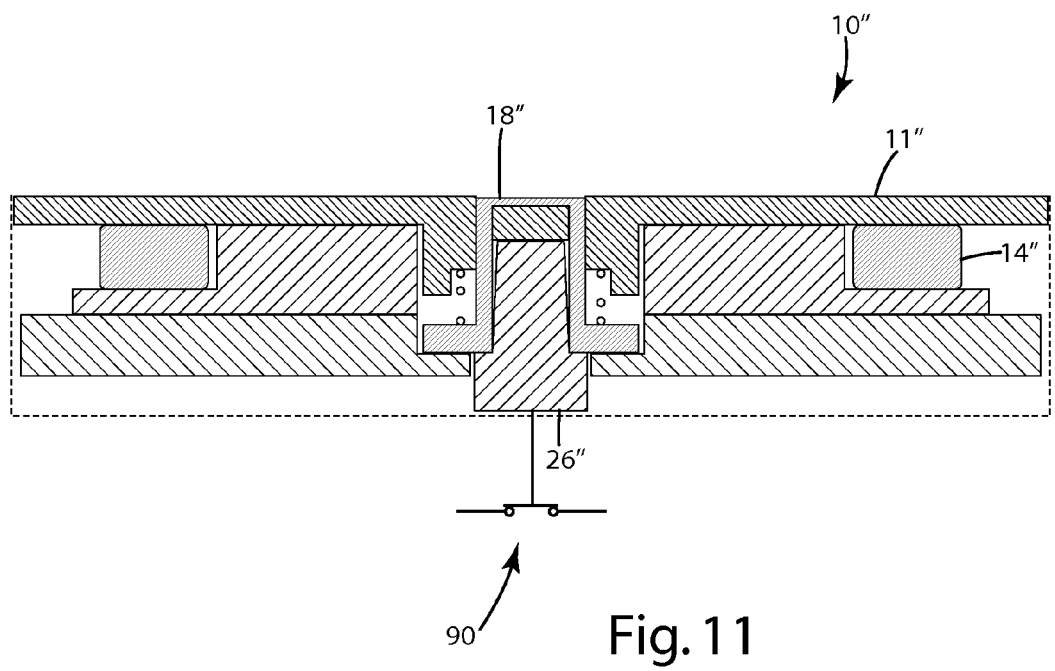
FIG. 11 is a cross-sectional view of the second alternative power supply having a normally closed switch.

In the alternative embodiment show in FIGS. 10-11, the wireless power supply 10" includes a switch 90 that is coupled to the plunger 18" to activate the power supply 10" only when the plunger 18" is extended. The wireless power supply 10" of this embodiment is essentially identical to wireless power supply 10, except as described herein and shown in the corresponding figures. In this embodiment, the control circuitry may be enabled or disabled based on the position of switch 90. In some embodiments, "enabling" and "disabling" the power supply 10" may include energizing or de-energizing the primary coil 14" while otherwise maintaining operation of the power supply 10. For example, the control circuitry may include a controller with the ability to determine the position of the switch 90 and enable/disable the supply of power to the primary coil 14" as appropriate. Alternatively, the switch 90 may have direct control over the power supply 10", for example, by preventing the flow of power to the power supply 10" when the plunger 18" is retracted. In the embodiment seen in FIG. 11, the charging surface can be continued on the top surface of the plunger. Wall surfaces and colors, wood grains and other treatments can be applied to prevent the noticeable aspects of these plungers and allow blending of the plunger into the surrounding environment.

In this embodiment, the switch 90 is positioned in the housing 11" and is coupled to the plunger cap 26", which moves with the plunger 18". More specifically, the plunger cap 26" of this embodiment is mechanically connected to the switch 90 so that movement of the plunger cap 26" results in mechanical actuation of the switch 90. The switch 90 may be a "normally open" switch, such as shown in FIG. 10 or a "normally closed" switch as shown in FIG. 11. The switch may alternatively be a Hall Effect switch, reed switch or other switch capable of sensing movement of the plunger 18". The Hall Effect switch, reed switch or other sensing switch may sense movement of the primary magnet 24".

The wireless power supply of any embodiment that includes an extendable/retractable plunger may include a system for automating extension and retraction of the plunger. For example, the power supply circuitry may have the ability to determine when a remote device is present and then extend the plunger, and to determine when the remote device has been removed and then retract the plunger. In one embodiment, the power supply determines when a remote device is present by periodically pinging the tank circuit and directly or indirectly evaluating the power in the tank circuit. The presence of a remote device within sufficient proximity to the primary will cause an increase in the power in the tank circuit. For example, the wireless power supply may include a sensor, such as a current sensor or voltage sensor in the tank circuit. In this example, a vacant power supply (e.g. a power supply not currently supplying power to a remote device) may periodically apply a short pulse of power to the tank circuit and use the sensor to measure a characteristic that is indicative of the amount of power in the tank circuit. The power supply may be pre-programmed with a threshold value that is determined to be indicative of the presence of a remote device (or a potential remote device). Once the sensor reading meets or exceeds this threshold, the wireless power supply may extend the plunger. The plunger may be retracted when the threshold is no longer met, for example, because the measured characteristic has dropped in value due to removal of the remote device. In embodiments that include communications between the power supply and the remote device, the power supply may retract the plunger if the object on the charging surface fails to send communications that indicate it is a valid remote device. As another example, the remote device may have the ability to trigger a switch within the power supply. For example, the remote device may have a magnet capable of triggering a reed switch, hall effect sensor or other magnetically-actuatable switch in the power supply. When the switch is actuated by the presence of the remote device, the wireless power supply may extend the plunger. When the switch is again actuated by removal of the remote device, the wireless power supply may retract the plunger. Although not shown, the automated plunger extension/retraction mechanism may include a solenoid, motor or another suitable electrical, mechanical or electromechanical mechanism.

A second aspect of the present invention is shown in FIGS. 12-17. In this aspect, the power supply 210 includes a peg 218 and primary 214 that are movably mounted in the charging surface 216. Once the remote device 100 is placed on the peg 218, the peg 218 and primary 214 will travel with the remote device 100 as it is moved on the charging surface 216. This facilitates close alignment between the primary 214 and the secondary 104 while at the same time providing spatial freedom of the remote device 100 on the charging surface 216.

Figure 15:
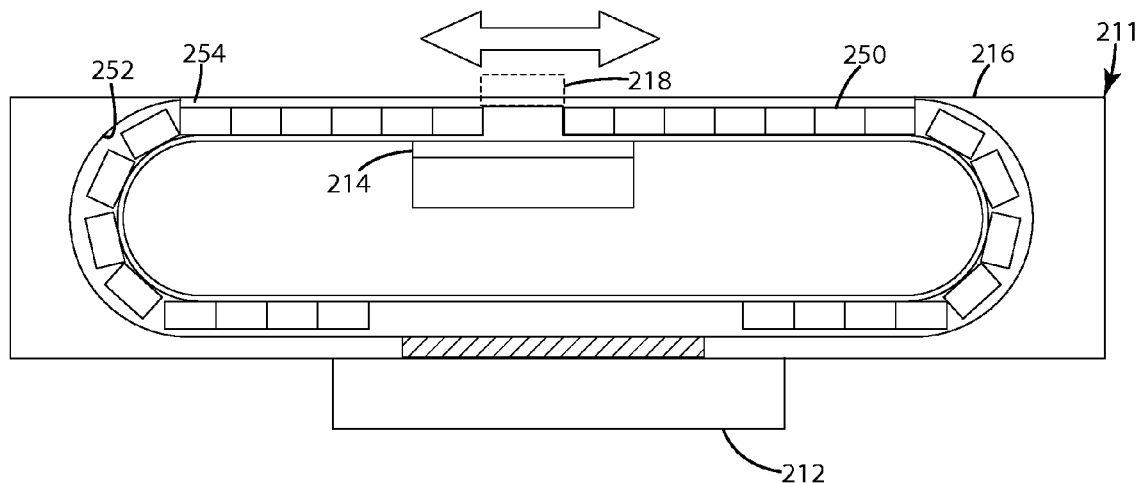
FIG. 15 is a representational cross-sectional view of the power supply of FIG. 12.

One embodiment of this aspect of the present invention is shown in FIGS. 12-15. In this embodiment, the peg 218 is movable along the charging surface 216 in a single direction. The wireless power supply 210 includes a housing 211, power supply circuitry 212, a primary (e.g. primary coil 214), a charging surface 216, a peg 218 and a movable tambour surface 250. The peg 218 is mounted within the tambour surface 250 so that the peg 218 moves with the tambour surface 250. The charging surface 216 includes a track 252 for operatively retaining the tambour surface 250. The tambour track 252 and tambour surface 250 are generally conventional and therefore will not be described in detail. Suffice it to say that the tambour surface 250 includes a plurality of slats (or other similar components) that are hingedly linked to one another along their longitudinal edges. The lateral edges of the tambour surface 250 are slidably fitted into the tambour track 252 so that the tambour surface 250 may move along the track 252. Referring now to FIG. 15, the track 252 is curved so that the tambour surface 250 may roll underneath itself. The charging surface 216 defines a slot 254 positioned along the tambour track 252. The peg 218 may be a fixed component that protrudes from the tambour surface 250 through the slot 254 in the charging surface 216. The distance that the peg 218 extends about the charging surface 216 may vary from application to application, but is generally a sufficient distance to securely receive a remote device 100. Alternatively, as represented in FIG. 15, the peg 218 may be extendable and retractable, for example, through the operation of magnets like plunger 18 of power supply 10. The primary 214 may be mounted to the interior of the tambour surface 250 to move with the peg 218. For example, the primary 214 may be mounted in coaxial alignment with peg 218. Although not shown, the power supply 210 may include primary ferrite, if desired. In use, the remote device 100 is placed on the charging surface 216 with socket 106 fitted over peg 218. This aligns the primary 214 and the secondary 104 to provide improved wireless power transfer. After the remote device 100 is placed on the peg 218, the remote device 100 can be move back and forth along the charging surface 216 in the direction of travel of the tambour surface 250. As the remote device 100 is moved, the peg 218 travels with the remote device 100, thereby moving the primary 214 to retain close alignment between the primary 214 and the secondary 104 as the remote device 100 moves.

Figure 16:
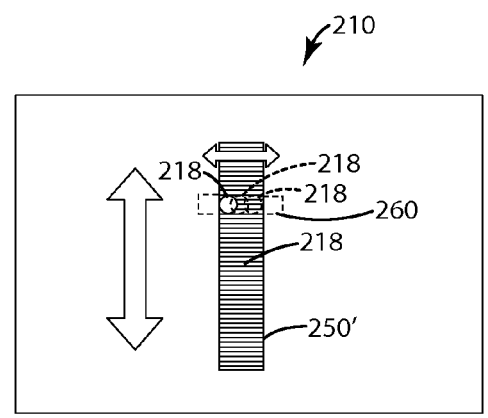
FIG. 16 is a representational top view of an alternative tambour track.
Figure 17:
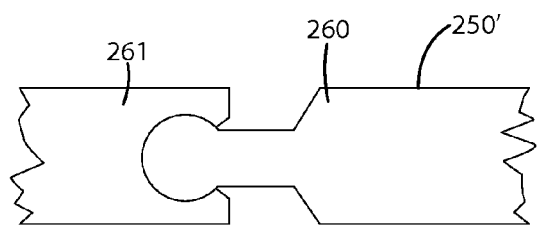
FIG. 17 is a representational end view of the tambour track of FIG. 16.

As noted above, power supply 210 provides a peg 218 that is movable along a single direction. If desired, the peg 218 may be provided with additional degrees of freedom. For example, as shown in FIG. 16-17, the tambour surface 250' may be configured to allow both lateral and longitudinal movement of the peg 218. As shown, the tambour surface 250' of this embodiment may include a slat 260 that is free to move laterally with respect to adjacent slats 261. This may be achieved by providing a tongue and groove interface between the movable slat 260 and its adjacent slats 261 as shown in FIG. 17. The peg 218 may be mounted in the movable slat 260 so that it can travel longitudinally as the entire tambour surface 250' moves along the tambour track and laterally as the movable slat 260 travels laterally with respect to the remainder of the tambour surface 250'.

Figure 18:
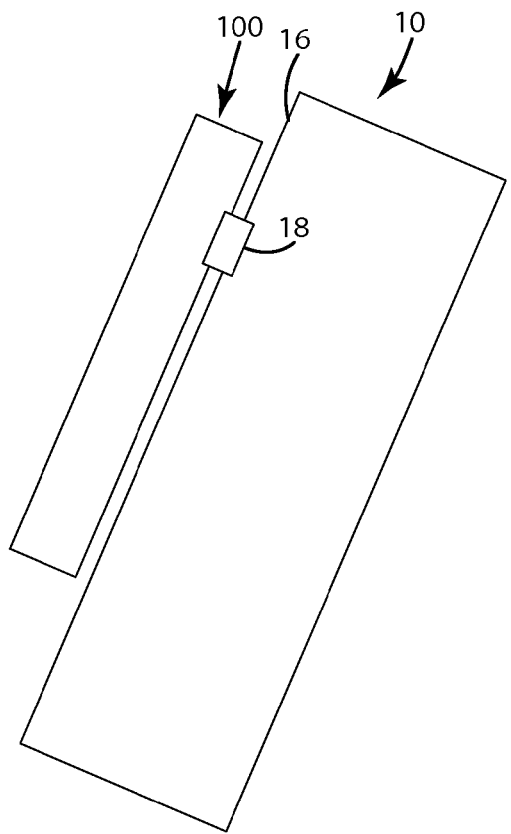
FIG. 18 is a representational side view of a remote device positioned on an inclined charging surface.
Figure 19:
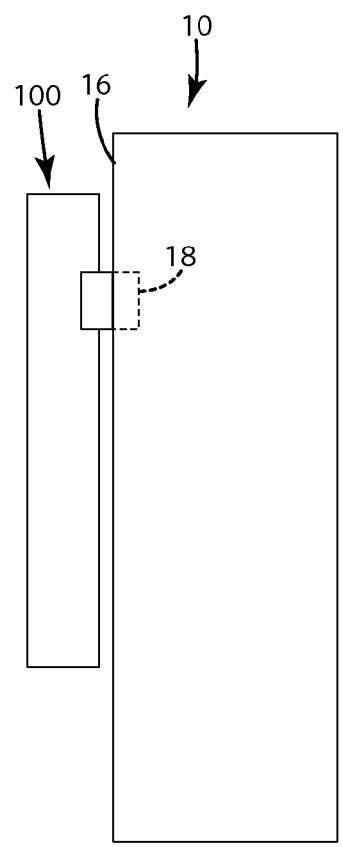
FIG. 19 is a representational side view of a remote device positioned on a vertical charging surface.
Figure 20:
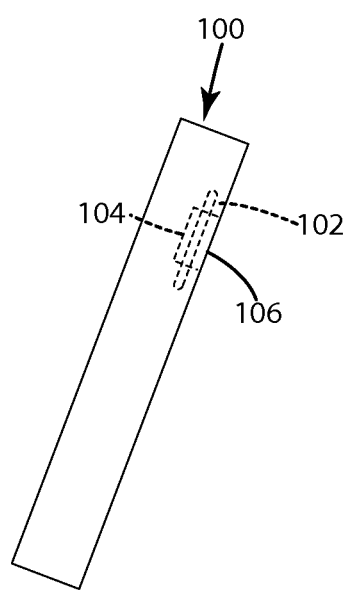
FIG. 20 is a representational side view of a remote device.
Figure 21:
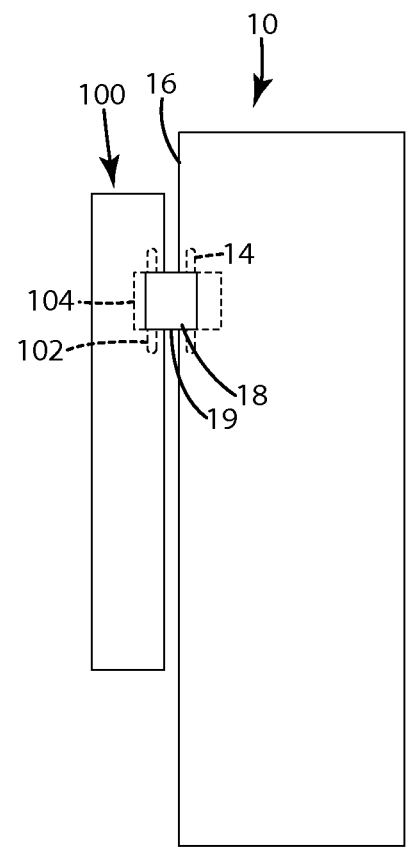
FIG. 21 is a representational side view of remote device positioned on a vertical charging surface and showing a plunger with a core passing through both the primary coil and the secondary coil.

In the embodiment shown in FIGS. 1-5, the power supply 10 includes a charging surface 16 that extends generally along a horizontal plane, such as a desktop or countertop. The power supply 10 is also well suited for use at different orientations. For example, as represented in FIGS. 18-21, the power supply 10 (and/or the charging surface 16) may be inclined at different angles to permit its use in a wide variety of applications, such as securing a video monitor or viewer on a wall, a lamp on a wall, a portable electronic device on a dash in a vehicle or a remote control on the surface of an appliance. FIG. 18 shows a remote device 100 positioned on an inclined charging surface 16, such as a car dash. In this embodiment (and other embodiments), the plunger 18 may be replaced by a fixed peg that is not capable of extending/retracting. FIG. 19 shows a remote device 100 positioned on a vertical charging surface 16, such as a wall. FIG. 20 shows a remote device 100 intended to be placed on the power supply 10 of FIG. 21. The power supply 10 of FIG. 21 includes a plunger 18 having an electromagnetic core material 19, which is represented by the black shaded region. As shown, once the plunger 18 is extended, the core material 19 spans the gap between the primary coil 14 and the secondary coil 104 to provide the benefits of an electromagnetic core material. In these embodiments, the plunger 18 and socket 106 interact to support the remote device on the charging surface 16. To improve the interconnection between the plunger 18 and the socket 106, the plunger 18 and socket 106 may be provided with complimentary contours. For example, the tip of the plunger 18 may include a protrusion and the socket 106 may include a corresponding undercut (not shown). As another example, the plunger 18 may be oriented at an angle to the charging surface 16 and socket 106 may be defined at a corresponding angle (not shown). In this embodiment the peg is designed to hold the device in a vertical or semi-vertical position. By placing the socket above the center of gravity within the selected device will allow suspension in the proper orientation or allow the device to be weighted in the proper direction. Surface friction of the materials used can become important when a less than vertical surface is used. Teflon surfaces or treatments may be used to allow the device to move freely and in other applications rubber like surfaces or treatments may be chosen to resist or prevent movement. It should also be noted that a slight undercut or lip may be detailed in the socket. The reverse detail can be designed in the peg to allow the peg and socket to be more secure in a vertical or semi-vertical position once the weight of the device moves the device into the undercut on the upper portion of the peg. (not shown) In another embodiment the plunger body and plunger can be ferrite to better couple power from the primary to the secondary. The ferrite plunger assemble may incorporate a movable ferrite plunger and a coil wrapped around the ferrite plunger that moves with the plunger.

Figure 22:
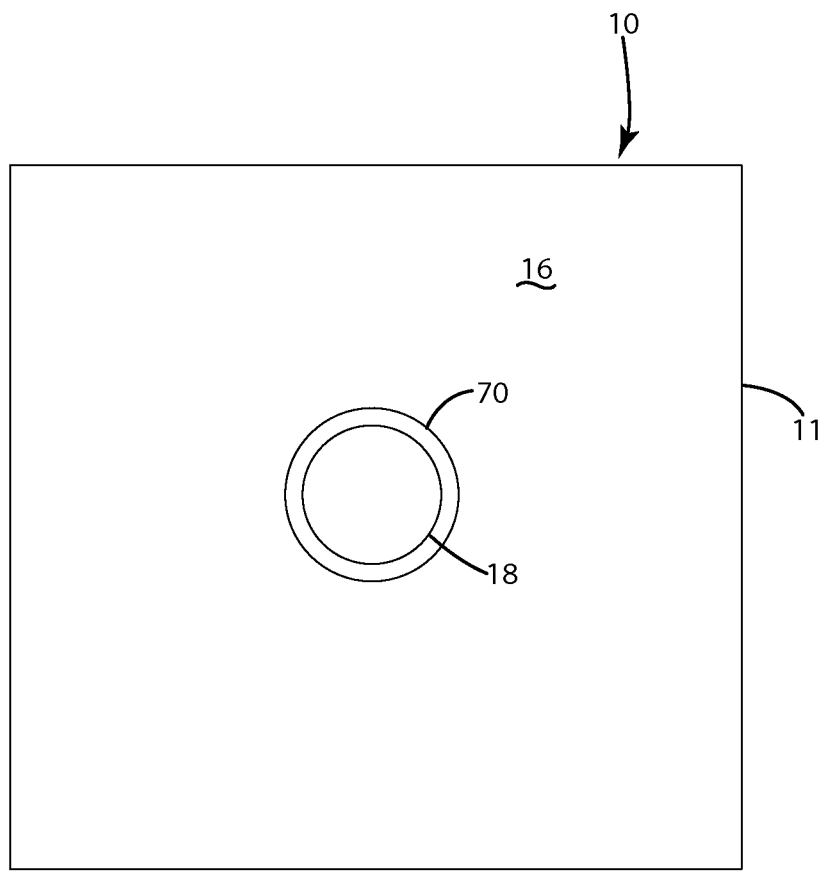
FIG. 22 is a representational top view of charging surface with a lighted ring.
Figure 23:
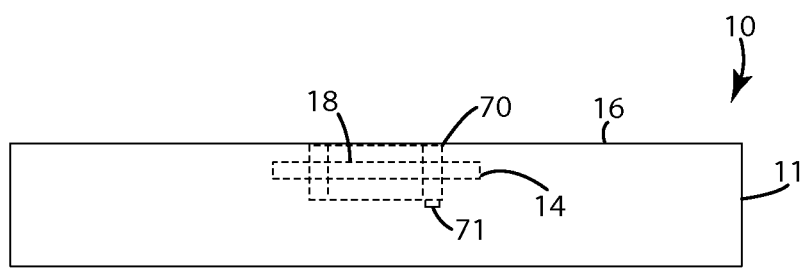
FIG. 23 is a representational end view of the charging surface with the lighted ring.

The charging surface 16 may be provided with an indicator to identify the presence of the wireless power supply 10 and/or the location of the plunger 18 within the charging surface 16. For example, as shown in FIGS. 22-23, the power supply 10 may include a glow ring 70. The glow ring 70 may be disposed coaxially around the plunger 18, and may be manufactured from essentially any translucent or transparent material. An LED or other light source 71 may be position in the housing 11 adjacent to the glow ring 70 to illuminate the glow ring 70 (See FIG. 23). The charging surface 16 may include other forms of indicia, such as other forms of lighting, specific contours, printed material or graphics.

Figure 24:
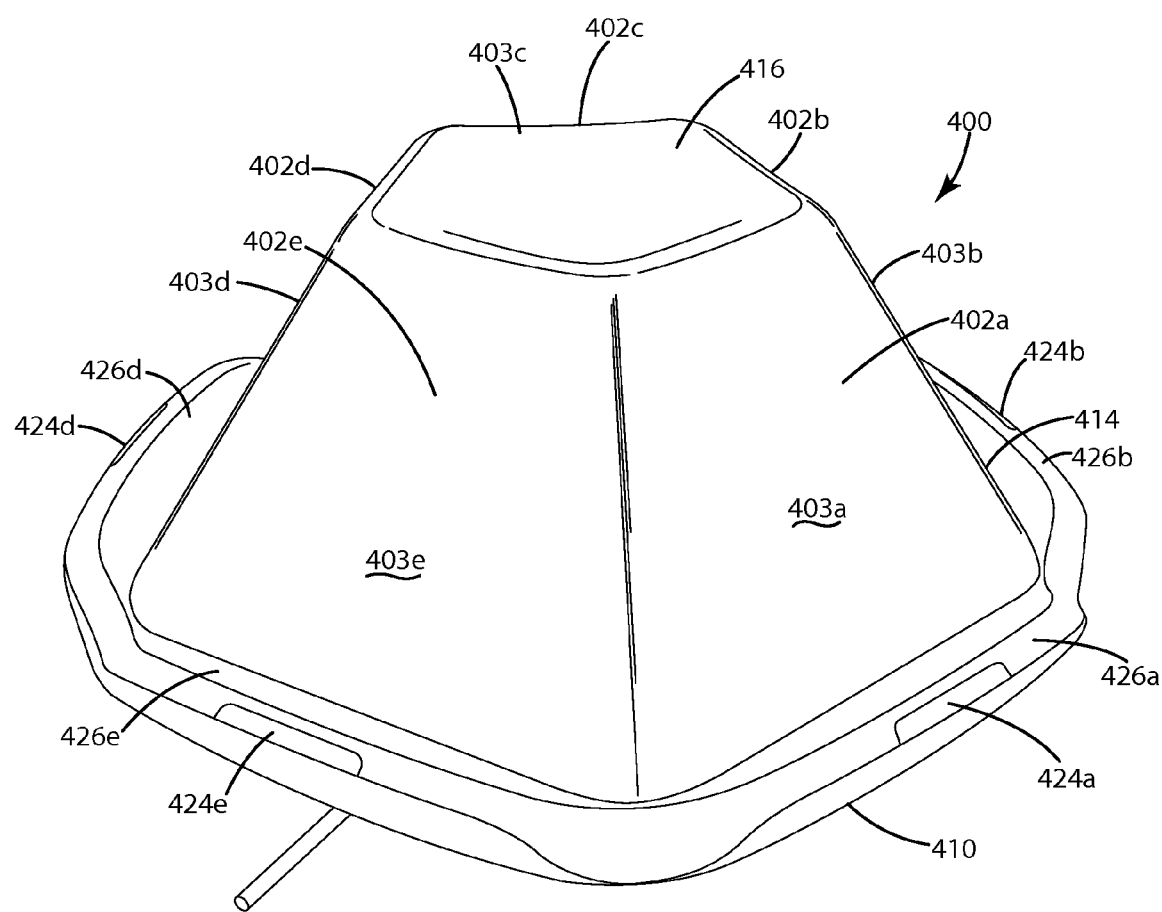
FIG. 24 is a perspective view of charging bowl in accordance with an aspect of the present invention.
Figure 25:
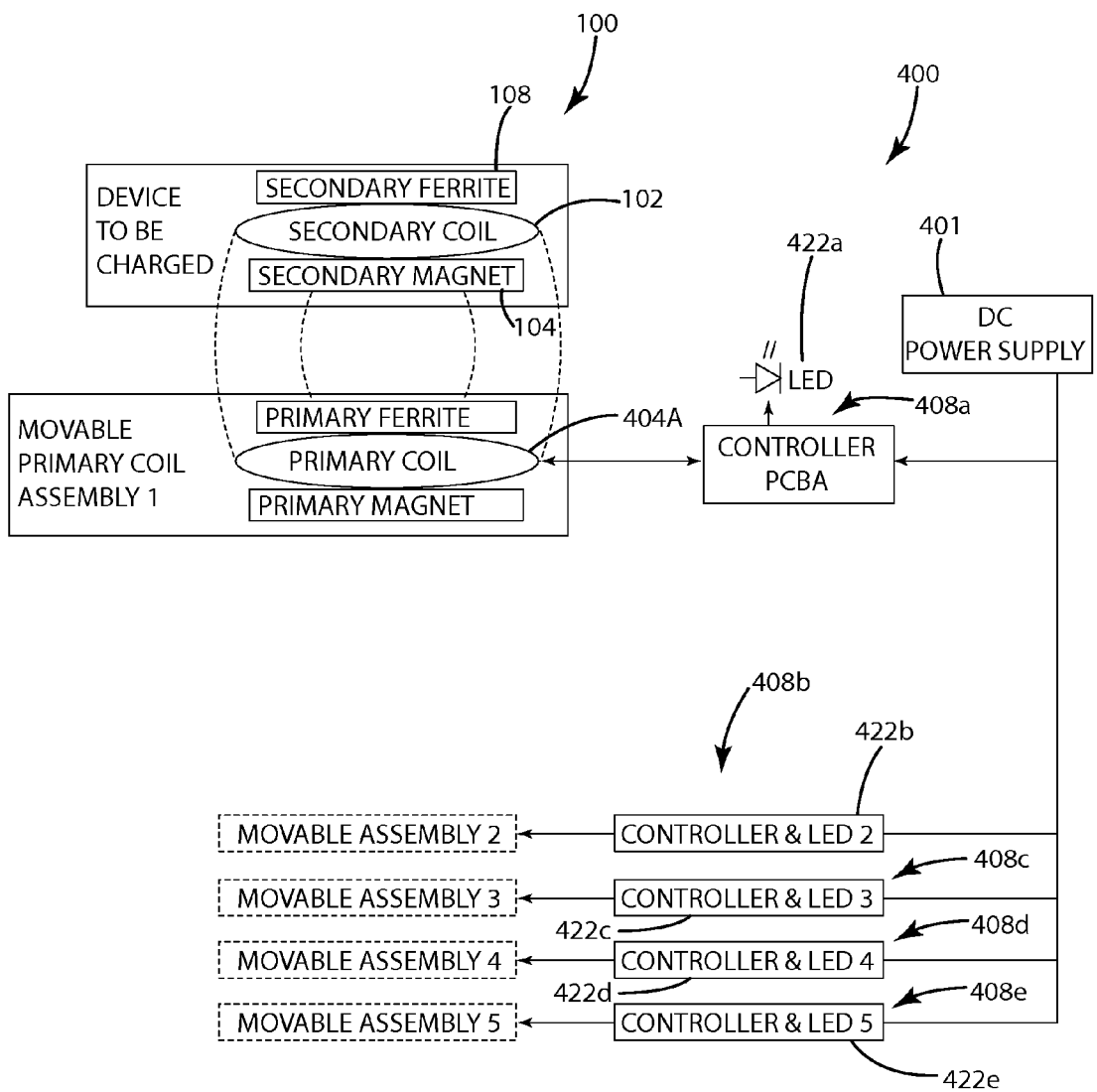
FIG. 25 is a schematic representation of the charging bowl electronics.
Figure 31:
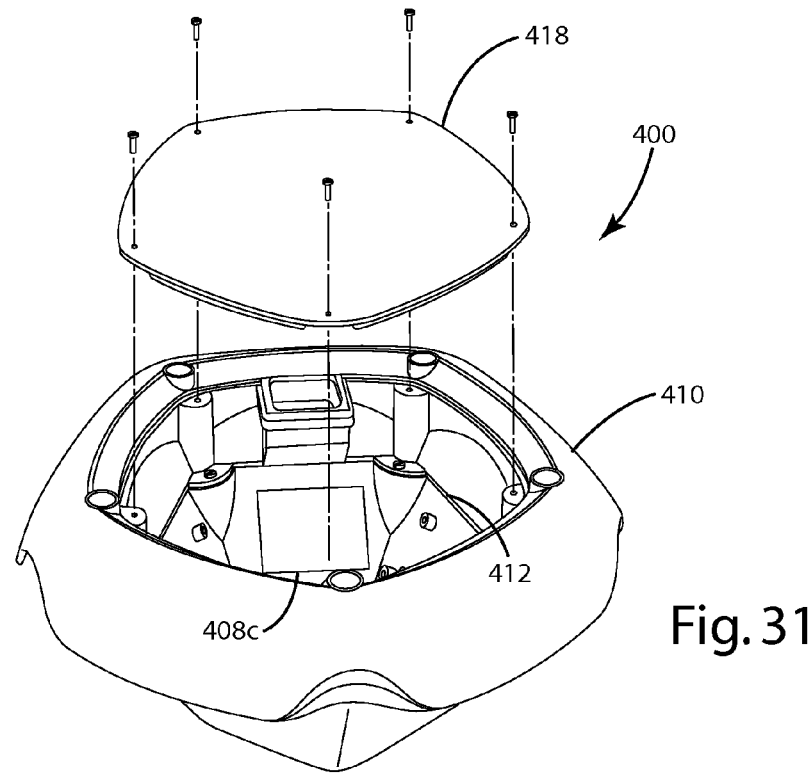
FIG. 31 is a bottom partially exploded perspective view of the access plate being installed on the frame/charging cover/foundation.
Figure 37:
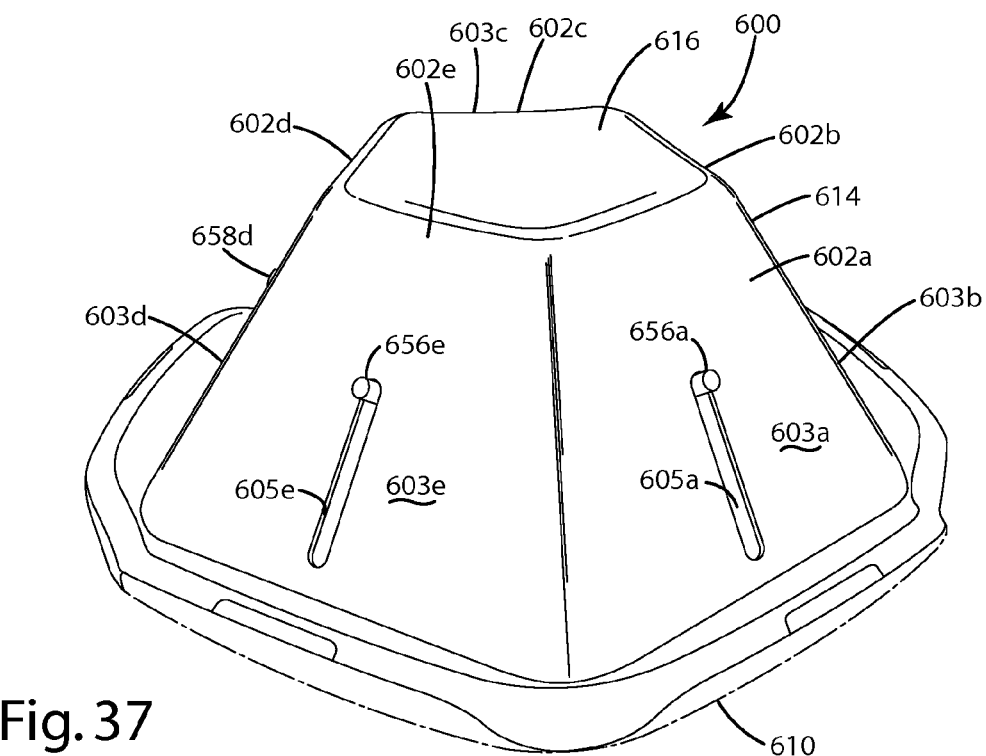
FIG. 37 is a perspective view of an alternative charging bowl with a moving peg.

In another aspect, the present invention provides a multiple-station charging bowl 400 capable of wirelessly supplying power to a plurality of remote devices (See e.g. FIGS. 24 and 37). The power may be used by the remote devices for essentially any purpose, including charging a battery (or other power storage device, such as a super capacitor) or powering the remote device. In the illustrated embodiment, the charging bowl 400 includes five charging stations 402*a-e*. The number of charging stations may vary from application to application. The charging bowl 400 may include essentially any wireless power supply circuitry capable of supplying power to the various charging stations. In the embodiment shown in FIG. 25, each charging station 402*a-e* includes a separate controller 408*a-e* (See FIG. 31), thereby providing each of the charging stations 402*a-e* with essentially independent operation. All of the controllers 408*a-e* receive DC power from a single DC power supply 401. This approach essentially eliminates any need to coordinate operation of the separate charging stations 402*a-e*. FIG. 25 shows a representation of the electronics in one embodiment of the charging bowl 400. In this representation, the components of a single charging stations 402*a* and remote device 100 are shown in more detail. The remaining four charging stations 402*b-e* are shown in less detail, but it should be understood that they could mirror the details of charging station 402*a*. Alternatively, all of the charging stations 402*a-e* may be powered by a single controller (not shown). For example, the charging bowl may include a single controller having sufficient power capabilities to simultaneously power all of the charging stations (not shown). As another example, the charging bowl may include a single controller that does not have sufficient power to charge all of the stations simultaneously, but that instead supplies power to the charging stations using any of a wide variety of power distribution algorithms (not shown). Exemplary power distribution algorithms include: (1) providing slugs of power to each occupied charging station in time slices so that all device receive substantially equal amounts of power over time, (2) providing slugs of power to each occupied charging station in time slices with the length of the time slices varying depending on the power needs of the different device, (3) sequentially fully charging the remote devices one at a time in the order that they were placed in the charging bowl or (4) dividing and simultaneously supplying the available power between the occupied charging stations. The listed power distribution algorithms are intended to be exemplary and are not intended to limit the present invention to any specific power distribution algorithm(s).

In the illustrated embodiments, the charging bowl 400 includes movable primaries 404a-e that provide the remote devices 100 with positional freedom while maintaining close alignment between the primaries 404a-e and the secondaries 102. In the embodiment of FIGS. 24-36, the primaries 404a-e and secondaries 102 are coupled in close alignment by magnets. In the embodiment illustrated in FIGS. 37-43, however, the primaries and secondaries are mechanically coupled using a plunger/peg (as described in more detail below).

The charging bowl 400 of FIGS. 24-36 is suitable for use in providing power to a wide range of devices that utilize electrical power. A remote device 100 intended for use with charging bowl 400 need not include a socket 106, and the secondary magnet 104 may be positioned in the place of the eliminated socket 106 coaxially within the center of the secondary coil 102.

Figure 26:
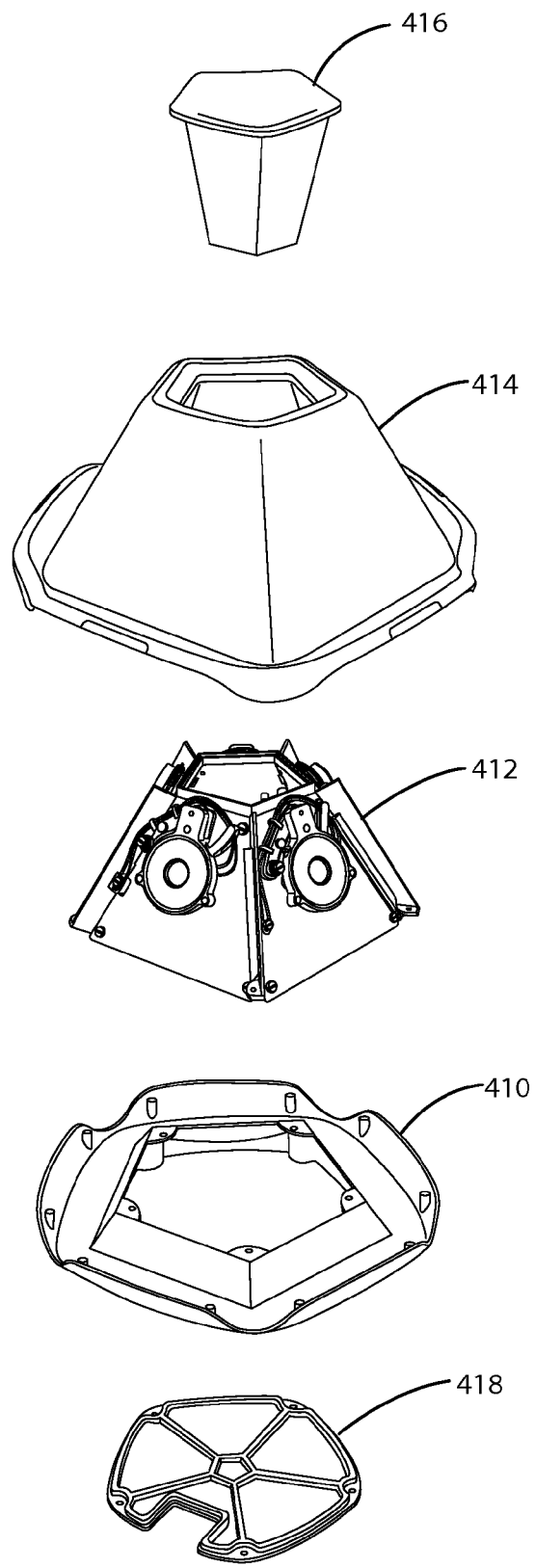
FIG. 26 is an exploded perspective view of the charging bowl.
Figure 30:
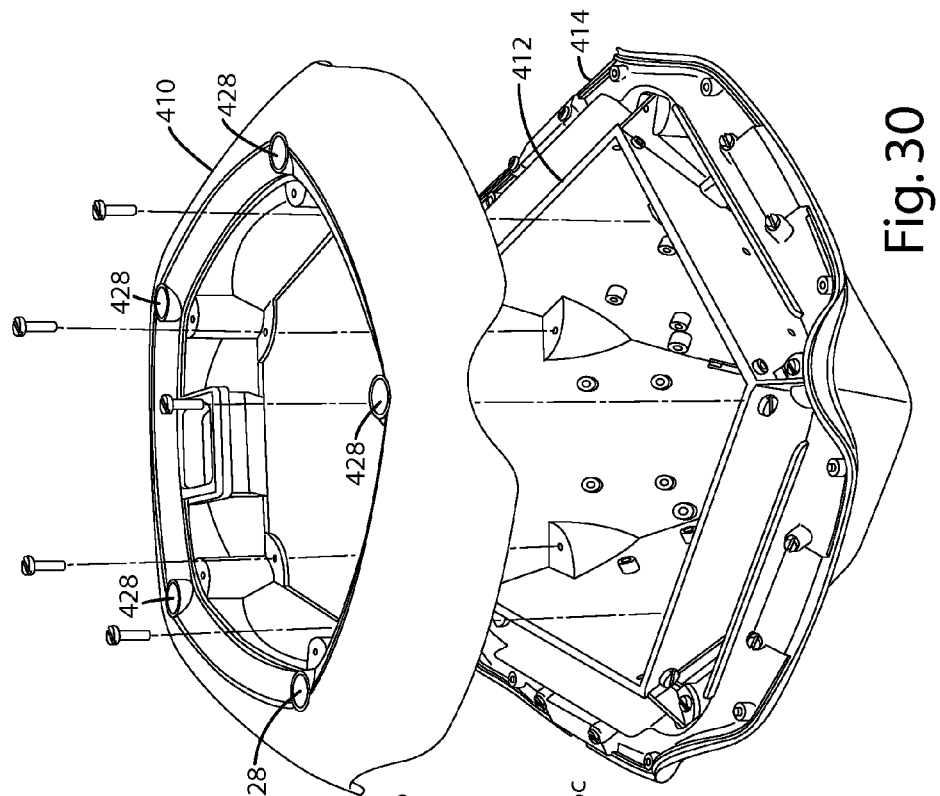
FIG. 30 is a bottom partially exploded perspective view of the foundation being installed on the frame/charging cover.
Figure 29:
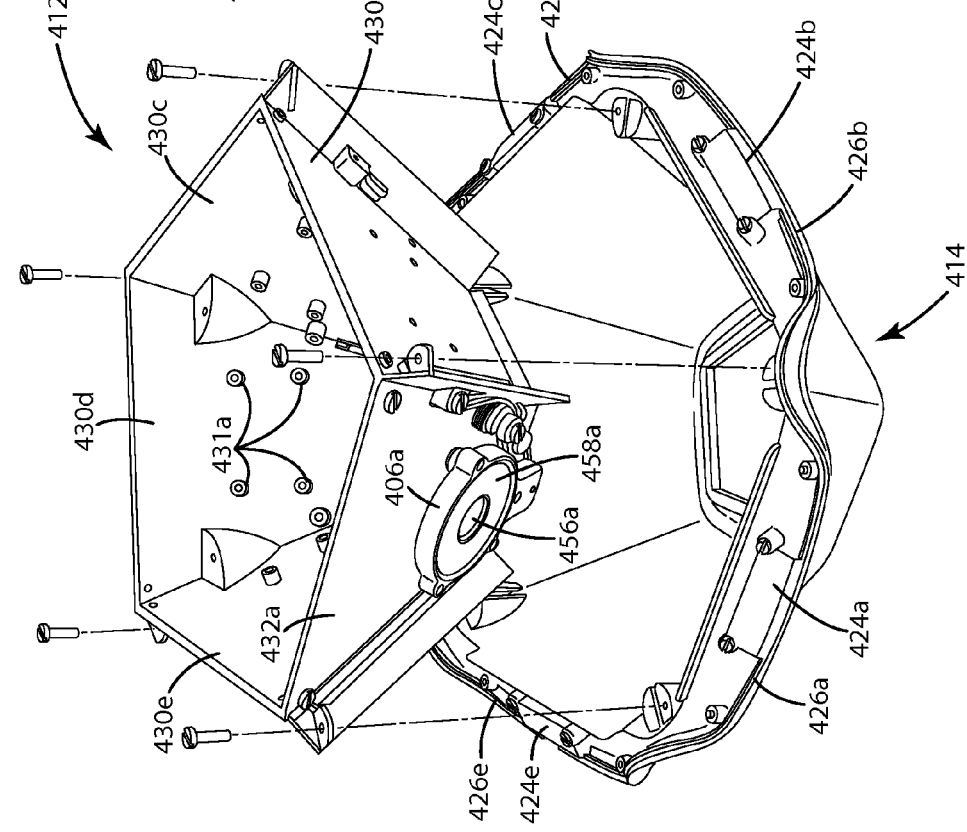
FIG. 29 is a bottom exploded perspective view of the frame being installed on the charging cover.

Referring now to FIG. 26, the charging bowl 400 generally includes a foundation 410, a frame 412, a charging cover 414, a cap 416 and an access plate 418. The power supply circuitry may be mounted to the foundation 410 and/or the frame 412. For example, a separate printed circuit board assembly (PCBA) controller 408a-e may be mounted to the backside of each frame plate 430a-e (described below) to control operation of the corresponding charging station 402a-e (See FIG. 31). All five of the PCBA controllers 408a-e may receive power from a single AC/DC power supply 401 (See FIG. 25) that is mounted to the foundation 410 and/or the frame 412. The frame 412 supports the primaries 404a-e and, in this case, the coil movement assemblies 406a-e (See FIGS. 27 and 28). The charging cover 414 covers the frame 412 and provides five separate charging surfaces 403a-e (See FIG. 29). The charging cover 414 is shaped to define a shelf 426a-e at the base of each charging surface 403a-e. The shelves 426a-e may support the remote devices 100 when they are placed on the charging surfaces 403a-e. The foundation 410 provides a base for the frame 412 and may include feet 428 to support the charging bowl 400 on a support surface (See FIG. 30), such as a desktop or countertop. The access plate 418 closes the bottom of the charging bowl 400 and may be removed to provide access to the power supply circuitry (See FIG. 31). The cap 416 closes the top of the charging bowl 400. The cap 416 may be shaped to define a vase, cup or tray, or may be provided with other functionality (See FIGS. 24 and 26).

Referring now to FIGS. 27 and 28, the frame 412 generally includes four trapezoidal plates 430a-e that are joined together along their sides to roughly define a five-sided truncated pyramid. The plates 430a-e may include a plurality of screw bosses for attaching various components to the plates 430a-e. For example, screw bosses 431a are used to secure the controllers 408 to the back side of each plate, screw bosses 431b are used to secure the guide plates 432a-e (described below), screw boss 431c is used to secure main pivot screw 436 (described below) and screw boss 431d is used to secure a wire clamp screw (not numbered). The plates 430a-e may define openings to permit wires to extend from the controllers 408 on the backside of the plates 430a-e to the primary coils 458a-e. In the illustrated embodiment, a guide plate 432a-e is mounted over each plate 430a-e, for example, by screws or other fasteners.

In the illustrated embodiment, a coil movement assembly 406a-e is mounted to each plate 430a-e over the corresponding guide plate 432a-e. The coil movement assemblies 406a-e allow the primary coil 458 to move to remain in alignment with the remote device 100. A single coil movement assembly 406a is shown in FIG. 27 for simplicity. When fully assembled, separate coil movement assemblies 406b-e are mounted to face of each guide plate 432b-e (See FIG. 28). The coil movement assembly 406a is pivotally mounted to the frame 412 by a main pivot screw 436. The main pivot screw 436 is fitted through main pivot washer 438 and main pivot bushing 440, and may be threaded directly into screw boss 431c and/or secured on the reverse side of the plate 430a by a nut (not shown). The coil movement assembly 406a may be biased in a central or home position by a torsion spring 442 or other biasing component. As shown, the torsion spring 442 may be fitted over the main pivot bushing 440. The torsion spring 442 causes the coil movement assembly 406a to return to a known "home" position when no remote device 100 is present. Because the starting positions of the coil movement assemblies 406a-e are known, this can facilitate initial alignment between remote devices 100 and the primary coils 458a-e when the remote devices 100 are placed on any one of the charging surfaces 403a-e.

Figures 32, 33:
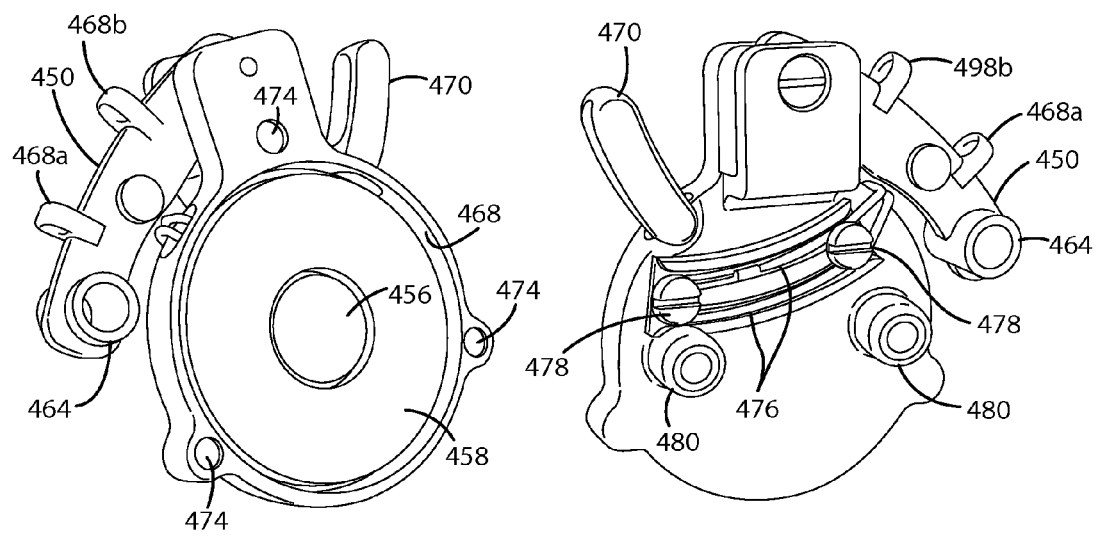
FIG. 32 is a front perspective view of a coil movement assembly.
FIG. 33 is a rear perspective view of the coil movement assembly.
Figure 34:
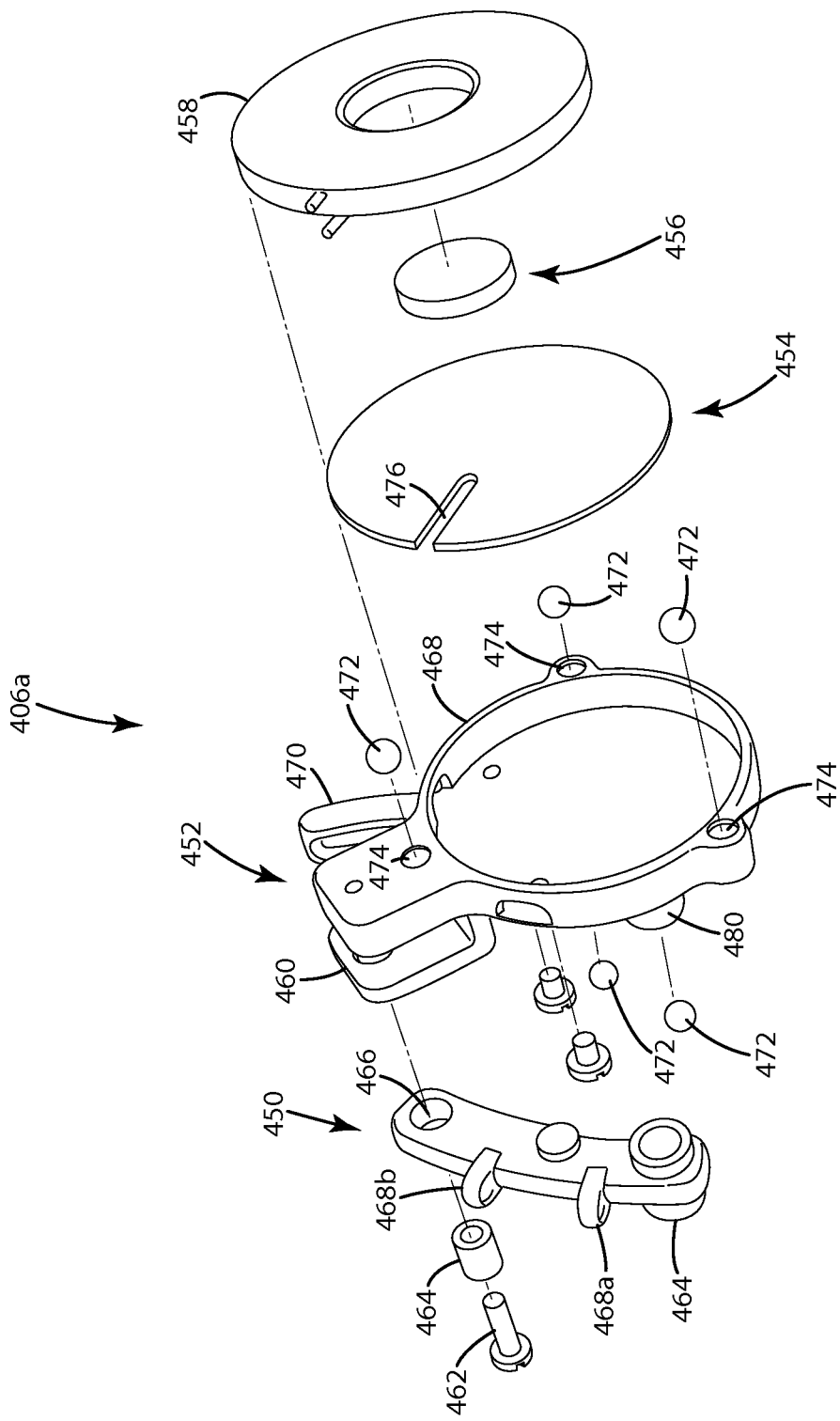
FIG. 34 is an exploded perspective view of the coil movement assembly.

In the embodiment of FIGS. 24-34, the coil movement assembly 406a-e is coupled with the remote device 100 by magnets located in the coil movement assembly 406a-e and the remote device 100. Front and rear perspective views of a single coil movement assembly 406a are shown in FIGS. 32 and 33, respectively. An exploded perspective view of the coil movement assembly 406a is shown in FIG. 34. The remaining coil movement assemblies 406b-e are essentially identical to coil movement assembly 406a and therefore will not be separately described. As perhaps best shown in FIG. 34, the coil movement assembly 406a generally includes a linkage arm 450, a medallion 452, a ferrite plate 454, a primary magnet 456 and a primary coil 458. The illustrated linkage arm 450 defines a pivot collar 464 at one end and a pivot hole 466 at the other. The linkage arm 450 may also includes wire routing tabs 468a-b through which wires from the power supply circuitry can be routed to the primary coil 458.

The medallion 452 includes a clevis 460, a generally circular housing 468 and a wiring loop 470. A plurality of ball bearings 472 are fitted into the front and back of the medallion 452 to facilitate its smooth and easy movement within the charging bowl 400. The rear ball bearings 472 are fitted into bearing seats 474 defined in the ends of bosses 480 (See FIG. 33). The front ball bearings 472 are fitted into bearing seats 474 recessed into the front surface of the medallion 452 (See FIG. 34). In use, the back ball bearings 472 ride along the front surface of the guide plate 432a and the front ball bearings 472 ride along the back of the charging surface 403a. The number, size and location of the ball bearings may vary from application. If desired, the ball bearings may be eliminated or replaced by other low-friction structures, such as PTFE slides or other similar low friction materials. The linkage arm 450 is pivotally secured to the clevis 460 by a medallion pivot screw 462. A medallion pivot bushing 464 is fitted over the medallion pivot screw 462 to facilitate pivotal movement of the medallion 452 with respect to the linkage arm 450. As perhaps best shown in FIG. 33, the medallion 452 may include wire routing grooves 476 and wire screws 478 on it backside. The wires from the primary coil 458 may be connected to the wires from the control circuitry at this location.

The ferrite plate 454, primary magnet 456 and primary coil 458 are fitted into the circular housing 468 of the medallion 452. In the illustrated embodiment, the diameter of the ferrite plate 454 is slightly smaller than the inner diameter of the housing 468. The ferrite plate 454 may define a wire slot 476 to route wires to or from the primary coil 458. The primary coil 458 may have an outer diameter that is slightly smaller than the inner diameter of the housing 468 and an inner diameter of sufficient size to accommodate the primary magnet 456.

In use, the pivotal connection between the coil movement assembly 406a-e and the frame 412 and the pivotal connection between the linkage arm 450 and the medallion 452 cooperatively provide the primary coil 458 with a board range of motion. When a remote device 100 is placed on a charging station 402a-e, the secondary magnet 104 and the primary magnet 456 are draw together by magnetic attraction. The magnetic attraction overcomes the bias of spring 442 and moves the primary coil 458 into alignment with the secondary coil 102. The ball bearings 472 facilitate smooth and easy movement of the medallion 452 within the charging station 402a-e. Once coupled by the magnets, the remote device 100 may be freely moved around the charging surface without losing alignment between the primary coil 458 and the secondary coil 102 subject to the limits of motion of the coil movement assembly 406a-e.

Figure 35:
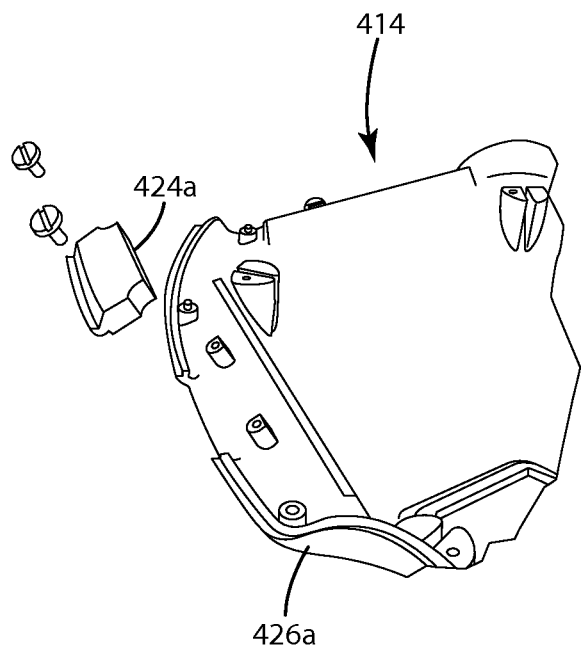
FIG. 35 is an exploded perspective view of a portion of the charging cover.
Figure 36:
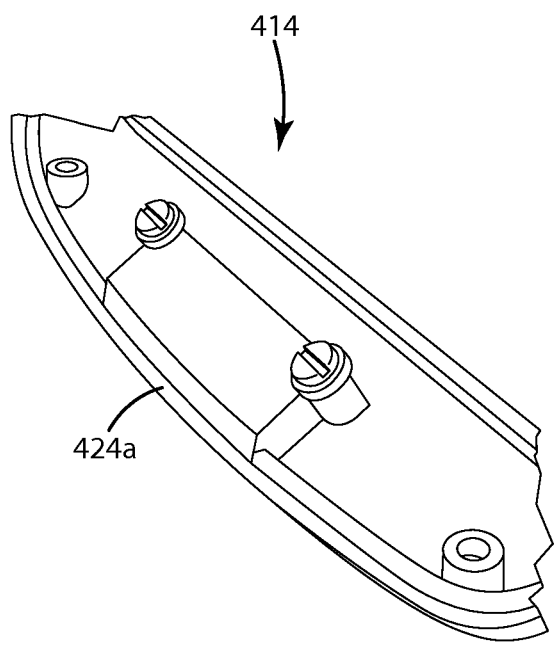
FIG. 36 is a perspective view of a portion of the charging cover.

In the illustrated embodiment, each charging station 402a-e includes an indicator light 422a-e (e.g. LED) to communicate the status of the charging station 400. The light 422a-e may simply communicate whether the station is on or off, or it may provide communications that are more comprehensive. For example, the light 422a-e may flash in different patterns or change colors/brightness to indicate different statuses. If desired, the light 422a-e may blink in prescribed patterns to communicate information, such as different error conditions. In the illustrated embodiment, each charge station 402a-e includes a light pipe 424a-e. The light pipes 424a-e are exposed beneath the corresponding charging surfaces 403a-e where they are readily visible to a user. Referring now to FIGS. 35 and 36, the light pipe 424a for charging station 402a may be secured to the undersurface of the corresponding shelf 426a, for example, by screws or other fasteners. The remaining light pipes 424b-e may be similarly mounted under the corresponding shelves 426b-e.

In an alternative embodiment of this aspect of the present invention, the coil movement assembly is mechanically coupled to the remote device (rather than magnetically as described above). As shown in FIGS. 37-43, the charging bowl 600 may include a movable peg 656a-e in each charging station 602a-e. The pegs 656a-e can be fitted into the socket 106 in a remote device 100 to mechanically couple the remote device 100 to the primary coil 658a-e in essentially the same manner described above in connection with wireless power supply 10. This embodiment is essentially identical to the charging bowl 400 except as described below and shown in the corresponding figures.

In this embodiment, the charging bowl 600 generally includes a foundation 610, a frame 612, a charging cover 614, a cap 616 and an access plate (not shown). The frame 612 supports the primary coils 658a-e and the coil movement assemblies 606a-e. The charging cover 614 covers the frame 612 and provides five separate charging surfaces 603a-e. The cap 616 closes the top of the charging bowl 600. The access plate (not shown) closes the bottom of the charging bowl 600 as shown above in connection with charging bowl 400.

Figure 38:
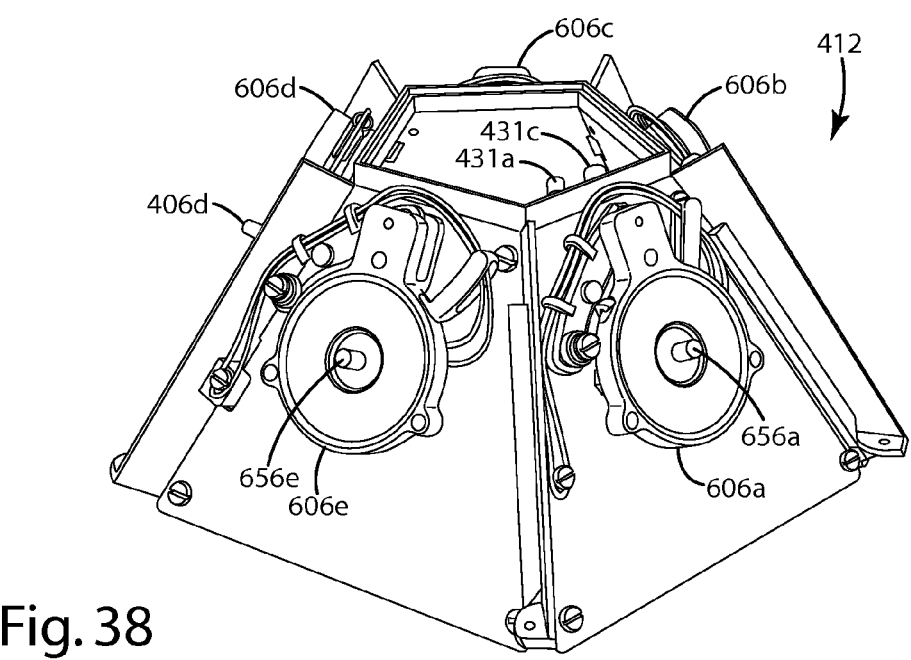
FIG. 38 is a perspective view of the frame of the alternative charging bowl with the coil movement assemblies installed.
Figure 39:
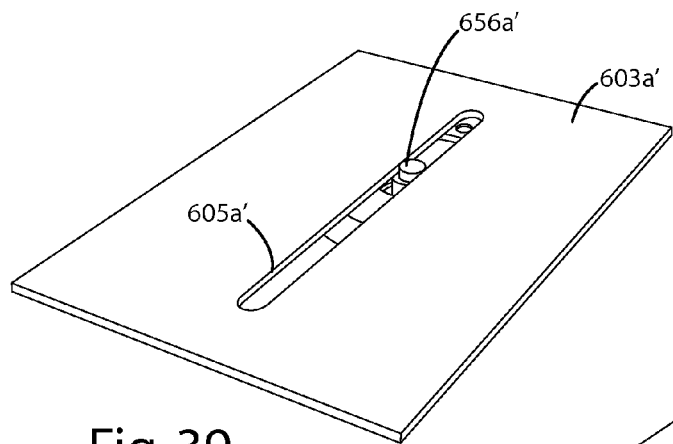
FIG. 39 is a perspective view of a portion of a second alternative charging bowl showing a plunger the retracted position.
Figure 40:
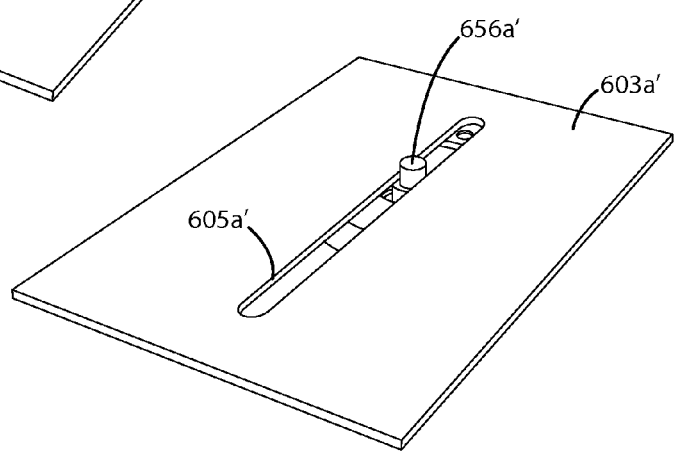
FIG. 40 is a perspective view of a portion of a second alternative charging bowl showing a plunger the extended position.

FIG. 38 shows the charging bowl 600 with the charging cover 614 removed. As can be seen, the pegs 656a-e are mounted in the center of the coil movement assemblies 606a-e. The coil movement assemblies 606a-e are generally identical to coil movement assemblies 406a-e, except that the primary magnets 456a-e are replaced by the pegs 656a-e. The pegs 656a-e are fixedly secured to the medallion 652a-e and extends a sufficient distance to be fitted into the socket 106 of a remote device 100. The linkage described above in connection with charging bowl 400 permits the medallion 652 and consequently the peg 656a-e to move beneath the charging surface 603a-e. Each charging surface 603a-e defines a slot 605a-e into which the peg 656a-e is fitted. The slot 605a-e permits up/down travel of the peg 656a-e.

If desired, the slot 605a-e in the face of the charging surface 603a-e may be widened in the left/right direction to provide the peg 656a-e with left/right movement. The linkage of the coil movement assembly 606a-e will permit the peg 656a-e to move left/right in addition to up/down as described above.

The embodiment of FIGS. 37 and 38 shows fixed pegs 656a-e. If desired, the fixed pegs 656a-e may be replaced by extendable/retractable plungers 656a-e'. For purposes of disclosure, this alternative embodiment is described in connection with a single charging station 602a' shown in FIGS. 39-43. The remaining charging stations 602b-e' are essentially identical to charging station 602a' and therefore will not be separately described. As in previously described plunger embodiments, the plunger 656a' may be retracted (See FIG. 39) to provide a relatively flat charging surface 603a' or extended (See FIG. 40) to provide a structure for mechanically coupling the remote device 100 to the primary coil 658a'.

Figure 41:
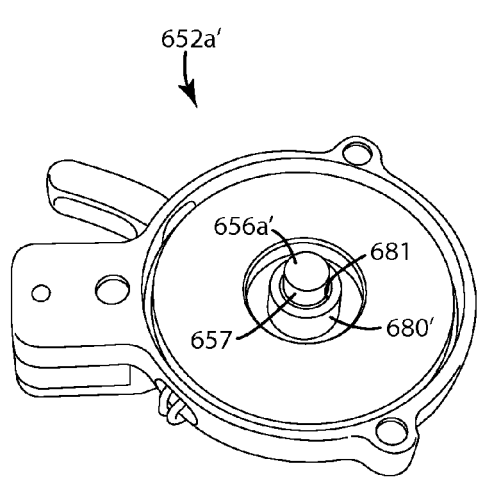
FIG. 41 is a perspective view of the medallion of a coil movement assembly with an extendable/retractable plunger.

The coil movement assemblies 606a-e' of this embodiment are essentially identical to the coil movement assemblies 606a-e described above, except that the plunger 656a-e' is mounted in the medallion 652a' for reciprocating motion. Referring now to FIGS. 41-43, each coil movement assembly includes a medallion 652a' that is movably mounted to the frame by a linkage arm. The medallion 652a' includes a tubular plunger neck 680' that defines a central opening 681. The plunger 656a' is movably seated within the plunger neck 680' with its body 657 protruding from the front side of the medallion 652a' and its retainer flange 683 disposed on the back side of the medallion 652a'. In this embodiment, the plunger 656a' is hollow and is fitted internally with a primary magnet 686a' that will interact with the secondary magnet 104 in the remote device 100 to extend the plunger 656a'. A coil spring 682a' is seated between the plunger 656a' and the medallion 652a' to bias the plunger 656a' in the retracted position. A plug cap 684a' is fitted into the mouth of the plunger neck 680' to secure the plunger 656a'. The primary coil 658a' and primary ferrite 654a' are disposed within the circular housing 658a' of the medallion 652a' as described above in connection with medallion 452.

FIG. 43 is a cross-sectional view of a portion of the charging bowl 600' showing the internal construction of a portion of a single charging station 602a'. This illustration shows the charging surface 603a' and the coil movement assembly 606a'. As shown, the coil movement assembly 606a' is disposed adjacent to the charging surface 603a' with the plunger 656a' extending through the slot 605a' in the charging surface 603a'. In this particular embodiment, the plunger 656a' is configured to remain in the slot 605a' and lie flush with the charging surface when in the retracted position. Although not shown, a plurality of ball bearings may be seated between the medallion 674' and the charging surface 603a' in bearing seats 676 (See FIG. 43).

Figure 44:
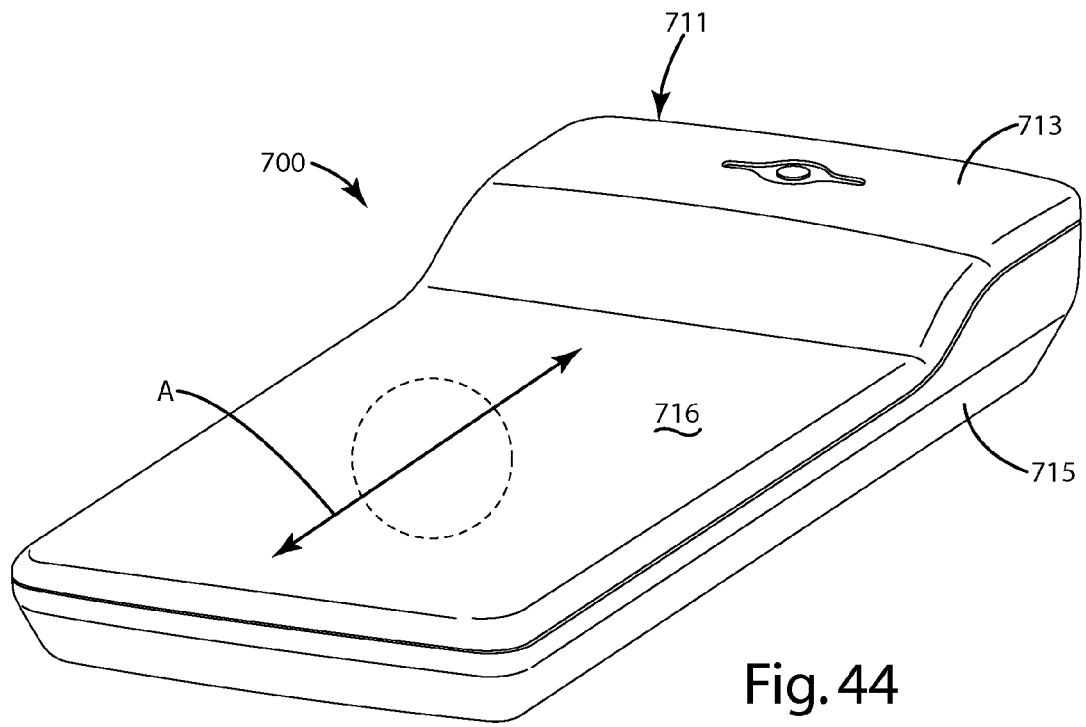
FIG. 44 is a perspective view of yet another alternative wireless power supply.
Figure 45:
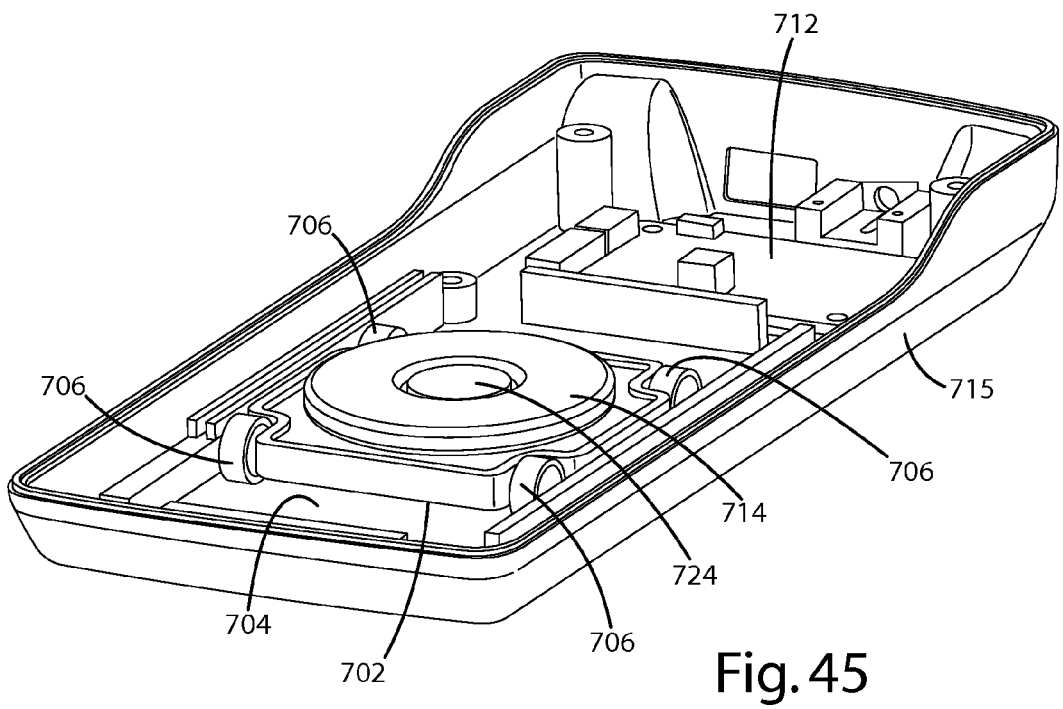
FIG. 45 is a perspective view of the wireless power supply of FIG. 44 with the cover removed.
Figure 46:
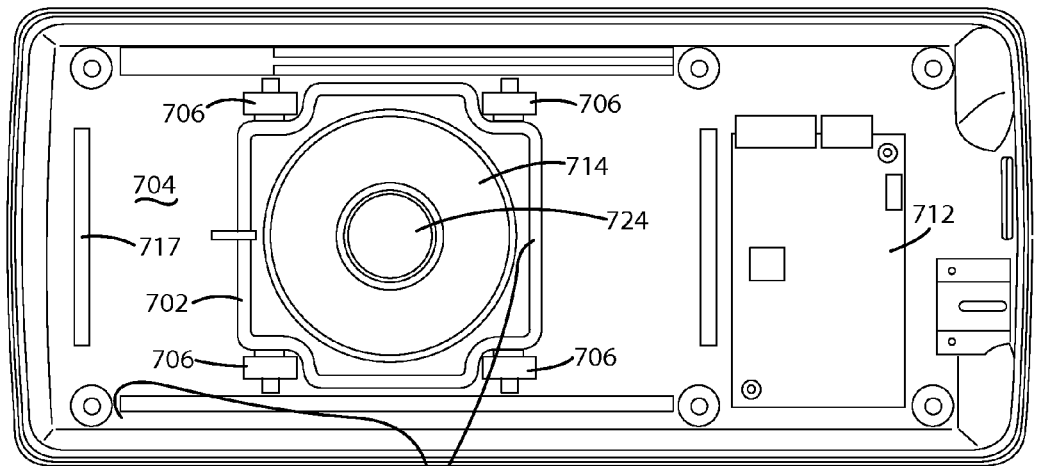
FIG. 46 is a top plan view of the wireless power supply of FIG. 44 with the cover removed.

Another alternative embodiment of the wireless power supply is shown in FIGS. 44-46. In this embodiment, the wireless power supply 700 generally includes a housing 711, power supply circuitry 712, a primary 714 and a primary magnet 724 (See FIGS. 45 and 46). The housing 711 includes a cover 713 and a base 715. The cover 713 defines a remote device support surface 716 capable of receiving a remote device intended to wirelessly receive power from the power supply 700. The primary 714 is movable (as represented by line A of FIG. 44) beneath the remote device support surface 716 to allow the primary 714 to move as desired to provide close alignment between the primary 714 and the secondary of a remote device (not shown) placed on the surface 716. In the illustrated embodiment, the primary 714 and the primary magnet 724 are supported on a carrier 702 that is movable along raceway 704 formed in the base 715. As shown, the carrier 702 is supported on the raceway 704 by wheels 706 or other bearings. Although the number of bearings may vary, the illustrated embodiment includes four bearings. The carrier 702 of this embodiment is intended to move with sufficiently little resistance that the primary magnet 724 is capable of drawing the primary 714 into alignment with the secondary in a remote device (not shown). For example, the primary magnet 724 may interact with a secondary magnet or with a magnet attractor (such as a piece of metal) located in the remote device (not shown). Alternatively, the remote device may include a secondary magnet and the power supply may include a magnet attractor. In the illustrated embodiment, the primary magnet 724 and secondary magnet (not shown) are located near the center of the primary and the secondary (not shown), respectively. Accordingly, when the primary magnet 724 and secondary magnet (not shown) are drawn together by magnetic attraction, it causes the primary 714 and the secondary (not shown) to move into coaxial alignment. The power supply 700 may include a spring 708 or other biasing member for returning the carrier 702 (and consequently the primary 714 and primary magnet 724) to a home position. For example, the power supply of the illustrated embodiment includes a "C"-shaped spring 708 that is positioned between the carrier 702 and the housing 711 (or some other component that is fixed with respect to the housing). The spring 708 urges the carrier 702 toward the end of the raceway 704 against stop 717. Accordingly, in this embodiment, the home position is reached when the carrier 702 is returned into engagement with stop 717. Although the spring force may vary from application to application, the spring 708 is selected to have a force that is overcome by the magnetic attraction of the primary magnet 724 and/or the secondary magnet (or magnet attractor) through the desire range of motion of the carrier 702.

In use, a user can place a remote device on the surface 716 in a position such that its secondary magnet (or magnet attractor) becomes magnetically coupled to the primary magnet. For example, this may occur by placing the remote device in a position in which the secondary magnet (or magnet attractor) is in rough alignment with the primary magnet 724. The remote device may then be slid to the desired position on the surface 716 and the magnetic attraction will cause the primary 714 to move along with the remote device, thereby maintaining close alignment between the primary 714 and the secondary (not shown).

Figure 47:
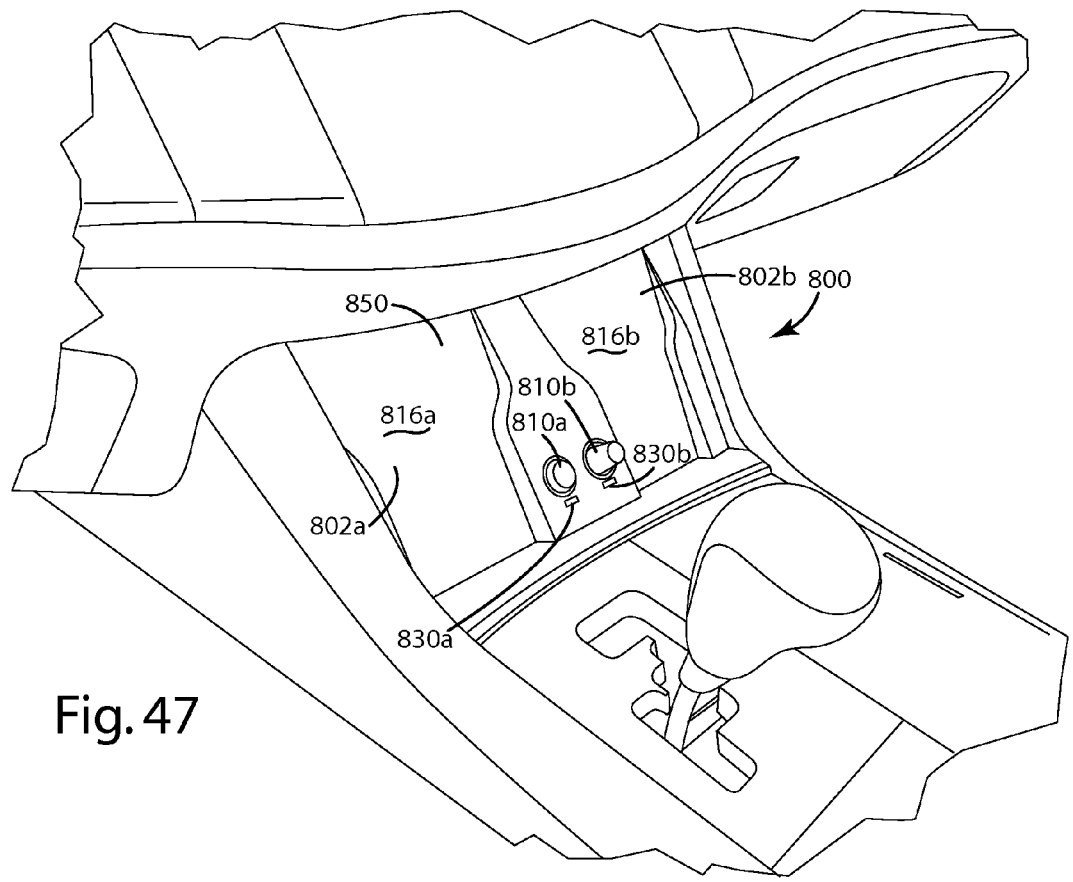
FIG. 47 is a perspective view of an alternative wireless power supply incorporated into an automobile instrument panel.
Figure 48:
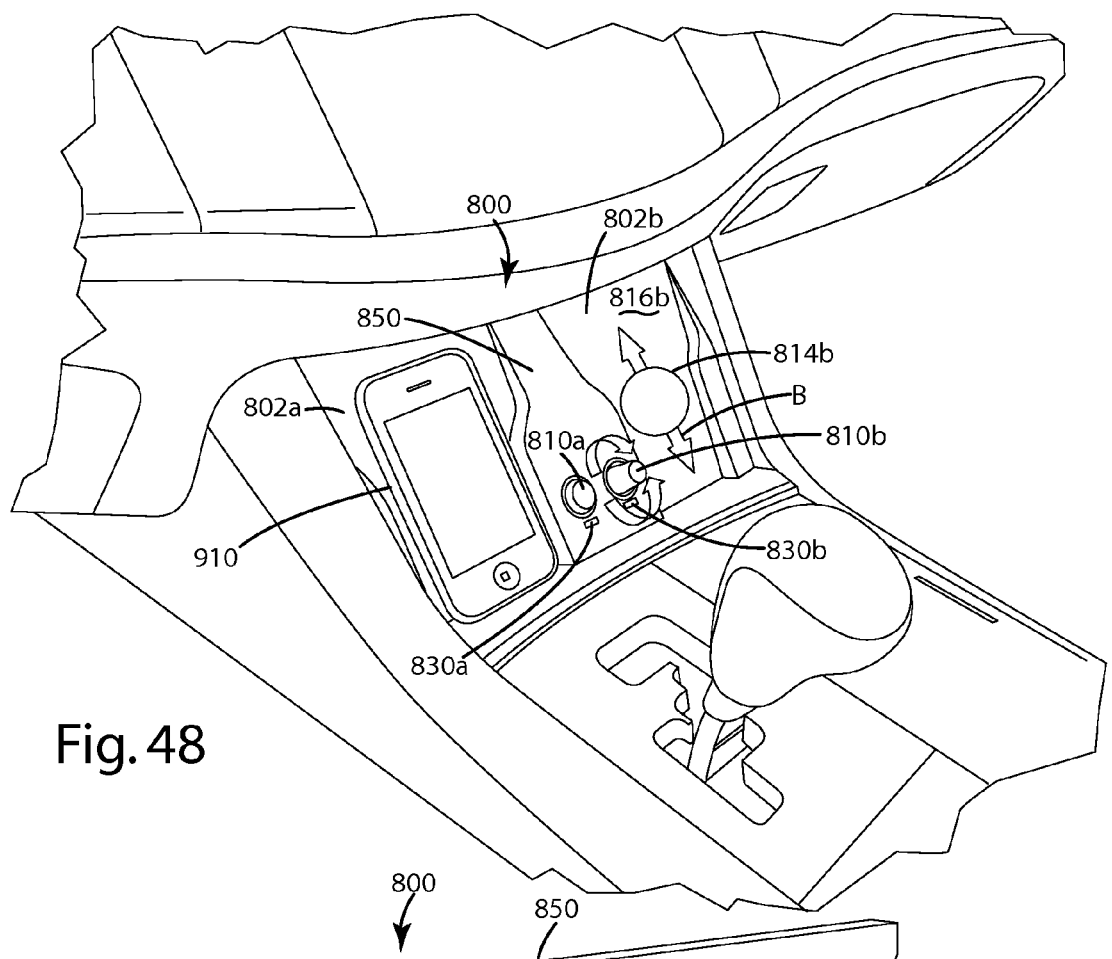
FIG. 48 is a perspective view of the wireless power supply of FIG. 47 showing a remote device on one charging station.
Figure 49:
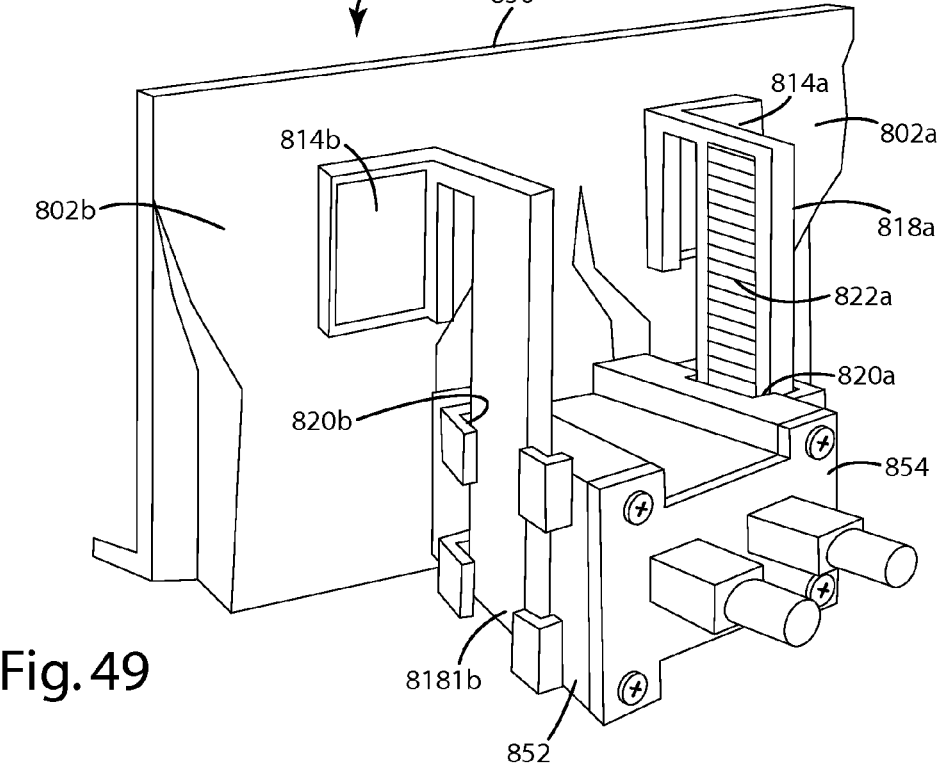
FIG. 49 is a rear perspective view of the wireless power supply of FIG. 47 removed from the instrument panel.

A further alternative embodiment of the power supply is shown in FIGS. 47-49. In this embodiment, the primary is movable through manual operation of a control, such as a control knob. For purposes of disclosure, this embodiment is described in connection with a wireless power supply integrated into an automobile instrument panel. It is not, however, limited for use in automotive applications. It may be incorporated into essentially any other application. For example, a manually positionable primary may be incorporated into a desk top charger, such as a charging pad or a charging bowl, or it may be incorporated directly into a work surface, such as a counter top, desk top or table top. The two power supply stations 802a and 802b may be driven by separate power supply circuitry (not shown). This allows the two power supply stations 802a and 802b to operate essentially independently of one another. Alternatively, the two power supply stations 802a and 802b may be driven by a single set of power supply circuitry. For example, a single power supply circuit may be capable of supplying power to both primaries simultaneously or separately supplying power to both primaries using time slicing or other multiplexing methods.

As shown in FIGS. 47 and 48, the power supply stations 802a and 802b are located in the instrument panel, for example, the center counsel 900 of the automobile. In this particular embodiment, the wireless power supply 800 includes two side-by-side wireless power supply stations 802a and 802b. The number and relative location of stations may, however, vary from application to application. The two power supply stations 802a and 802b are essentially identical differing only in that they are the minor image of one another. Each power supply station 802a and 802b includes a support surface 816a and 816b to support a remote device. The support surfaces 816a, 816b are inclined, but generally upright, to hold each remote device (See e.g. remote device 910 in FIG. 48) in a generally visible orientation. The location and orientation of the surfaces 816a, 816b may vary from application to application. Each power supply station 802a and 802b includes a movable primary 814a and 814b (shown representationally in FIG. 48) and a control 810a and 810b for manually adjusting the position of the primary 814a and 814b in a direction represented by line B of FIG. 48. The movable primaries 814a and 814b allows a user to adjust for alignment with the secondary even when the secondary may be in a different location from remote device to remote device.

Figure 50:
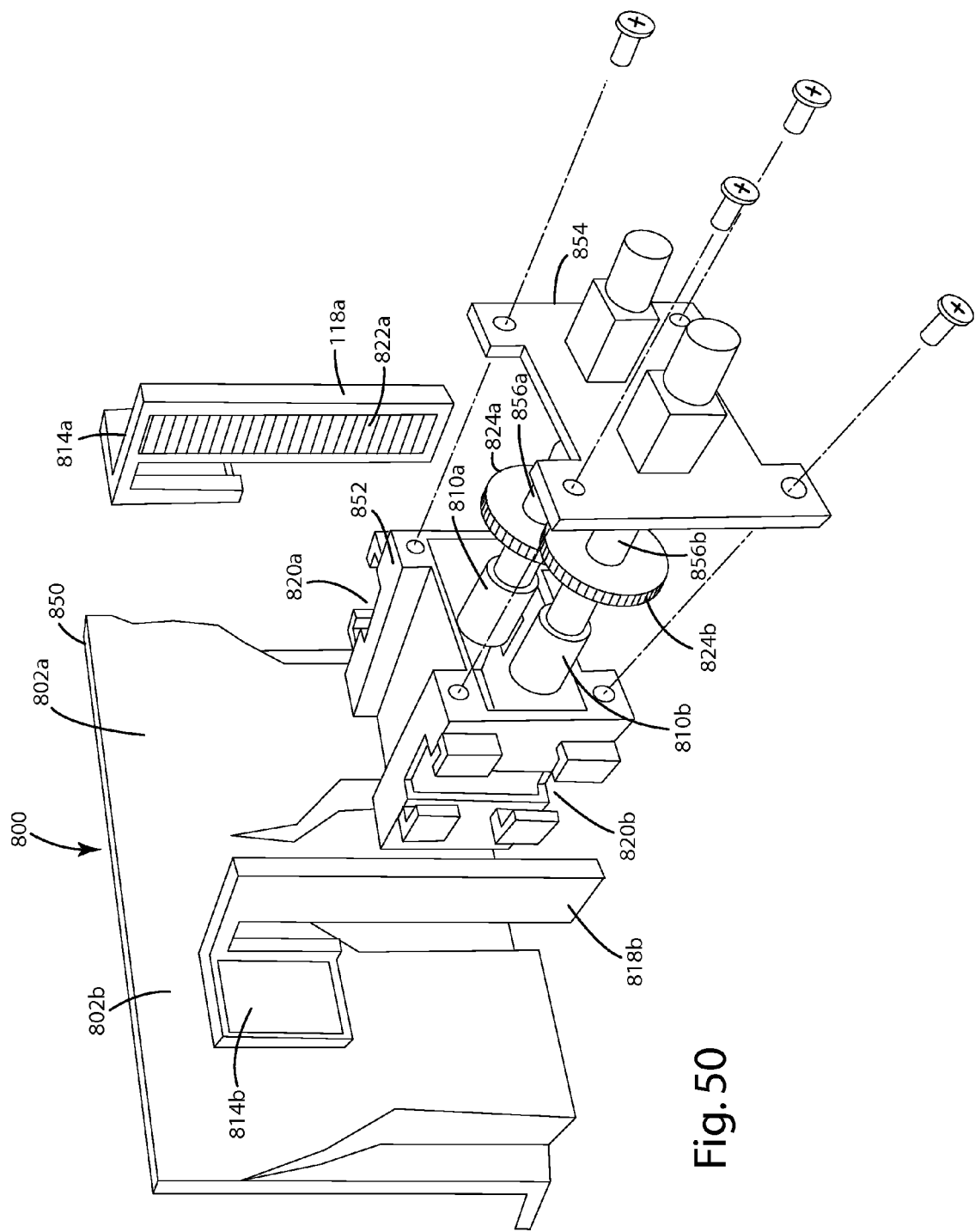
FIG. 50 is a rear partially-exploded, perspective view of the wireless power supply of FIG. 47.

In the illustrated embodiment, the primaries 814a and 814b are movable using rack-and-pinion assemblies. Referring now to FIGS. 49 and 50, the wireless power supply 800 generally includes a face plate 850, a gear box 852 and a rear cover 854. The primaries 814a and 814b are supported on carriages 818a and 818b. The carriages 818a and 818b are slidably fitted into channels 820a and 820b in the gear box 852. Each carriage 818a and 818b includes a row of teeth 822b (or rack) that is configured to interface with a drive gear 824a and 824b (or pinion) housed in the gear box 852 (See FIG. 50). Control knobs 810a and 810b are coupled to the drive gears 824a and 824b by shafts 856a and 856b, respectively. Accordingly, rotation of a control knob 810a and 810b results in rotation of the corresponding shaft 856a and 856b and the corresponding drive gear 824a and 824b. The teeth of each drive gear 824a and 824b is engaged with the teeth of the corresponding row of teeth 822b so that rotation of the control knobs 810a and 810b results in linear movement of the corresponding carriage 818a and 818b and consequently the corresponding primary 814a and 814b. In the illustrated embodiment, the control knobs 810a and 810b are extendable/retractable knobs so that they can be retracted into the instrument panel 900 when not in use. In this regard, the control knobs 810a and 810b may include essentially any structure that provides selectable extension and retraction of the knob. A number of suitable extendable/retractable mechanisms are in common use, for example, with automobile radio control knobs. The present invention is not limited to the illustrated mechanical linkage, but may for example incorporate essentially any mechanical or electromechanical linkage for providing movement of the primaries in response to user input. For example, in an alternative embodiment, the primary may be supported on a carriage that is directly movable by a sliding control arm. The illustrated embodiment provides the carriage with a single degree of freedom (e.g. movement along a single line of motion). The present invention may alternatively provide the primary with additional degrees of freedom. For example, the carriage may be movable along two different lines of motion, thereby allowing adjustment of the position of the carriage (and therefore the primary) within a plane rather than simply along a line. This may be achieved by providing two different controls, such as a control (e.g. knob or slider) for movement along the "x" direction and a second control (e.g. knob of slider) for movement along the "y" direction. Alternatively, a single control (e.g. a joystick) may be provided to control movement along both degrees of freedom.

The present invention may include a locking mechanism for securing the primary 814a or 814b in a given position. For example, in some applications, the primary (or primary carriage) may be capable of unintended movement, and a locking mechanism may be provided to secure the primary (or primary carriage) against the unintended movement. In the context of wireless power supply 800, it may be possible for the primary carriage 818a or 818b to move under the influence of gravity or from forces encountered by the moving vehicle. For example, the carriage 818a or 818b may slip down over time under the force of gravity and by the jarring impact of bumps in the road.

Figure 51:
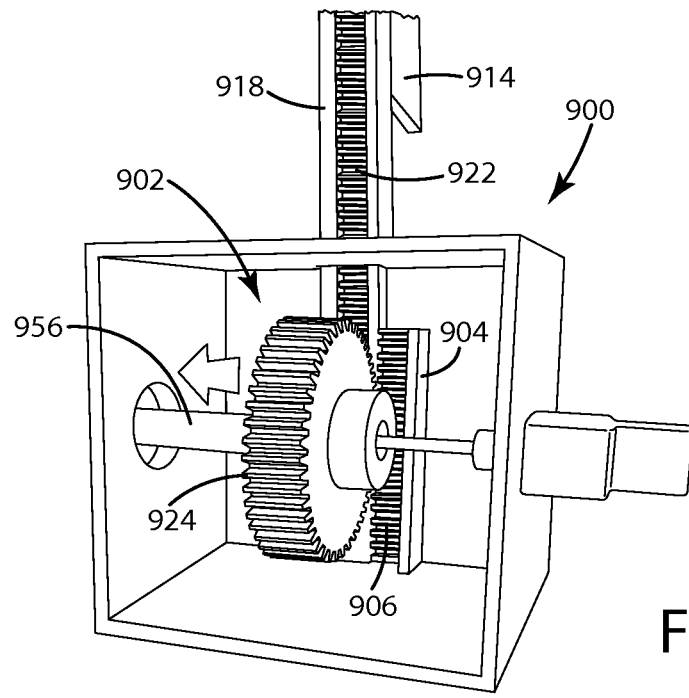
FIG. 51 is a partially exploded, perspective view of an embodiment of the wireless power supply having a carriage locking mechanism in the unlocked position.
Figure 52:
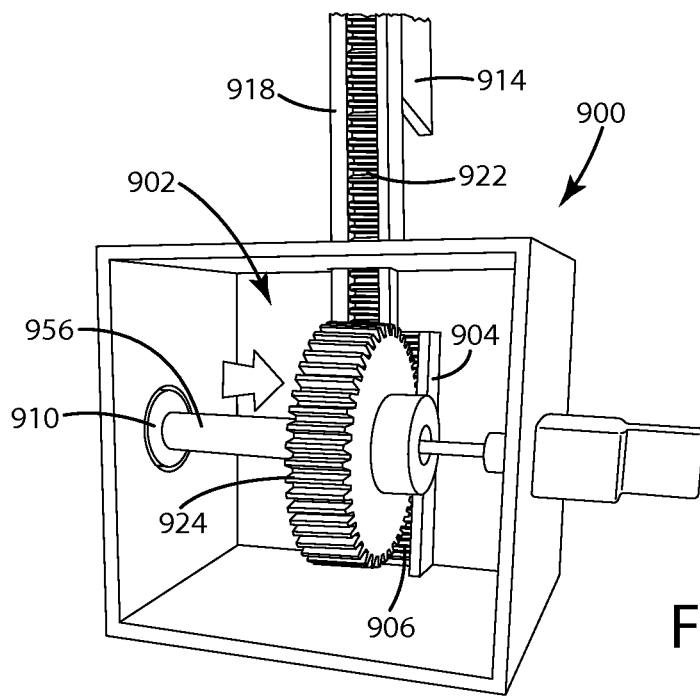
FIG. 52 is a partially exploded, perspective view of an embodiment of the wireless power supply having a carriage locking mechanism in the unlocked position.

One embodiment of a locking mechanism is shown in FIGS. 51 and 52. These illustrations show a portion of a single coil moving assembly 902 with an integrated locking mechanism. Referring to FIG. 51, the system 900 includes a fixed rack 904 disposed adjacent to the moving carriage 918, which includes rack 922. The fixed rack 904 includes teeth 906 configured to interfit with teeth of the drive gear 924. Further, the shaft 956 carrying the drive gear 924 moves axially when the control 910 is extended and retracted. The movement of the control 910 also moves the drive gear 924 axially between locked (FIG. 52) and unlocked (FIG. 51) positions. In locked position, the drive gear 924 is positioned so that its teeth are interfitted with both the fixed rack 904 and the moving rack 922. Because the fixed rack 904 is not capable of movement, the fixed rack 904 prevents rotational movement of the intermeshed drive gear 924. The rotationally-locked drive gear 924, in turn, prevents movement of the moving carriage 918. In the unlocked position, the drive gear 924 is moved axially into a position in which it is intermeshed with the moving carriage 918, but not intermeshed with the fixed rack 904. In this position, a user is free to rotate the control 910, which rotates the shaft 956 and the drive gear 924, which in turn causes movement of the moving carriage 918 and consequently the primary 914.

The wireless power supply may include circuitry and programming for automating operation of the locking mechanism. For example, the power supply circuitry may have the ability to determine when an appropriate coupling exists between the primary and the secondary. Upon detection of an appropriate coupling, the wireless power supply may engage the locking mechanism. In one embodiment, this may be achieved by providing the wireless power supply with a sensor, such as a current sensor in the tank circuit, capable of providing signals indicative of the quality of the coupling. Once the sensor reading meets or exceeds a certain threshold determined to be indicative of a sufficient coupling, the wireless power supply may engage the locking mechanism. The locking mechanism may be disengaged when the threshold is no longer met, for example, because the remote device has been removed. As another example, the remote device may have the ability to determine when an appropriate coupling exists between the primary and secondary, and to provide a corresponding signal to the wireless power supply. Upon receipt of that signal, the wireless power supply may engage the locking mechanism. In one embodiment, the remote device may include a sensor, such as a current or voltage sensor, capable of obtaining readings indicative of the amount of power being wirelessly received in the remote device. The remote device may provide a signal to the wireless power supply when the sensor reading indicates that the remote device is receiving power at or above a threshold value. Although not shown, the automated locking mechanism may include a solenoid, motor or another electrical, mechanical or electromechanical mechanism for selectively moving the drive gear 924 axially into and out of engagement with the fixed rack 904. In another embodiment, the automated locking mechanism may include a break or other locking mechanism that may be selectively moved into engagement with some portion of the carriage 918 or carriage drive train to hold the carriage 918 in a fixed position. For example, the automated locking mechanism may include an automated pivot arm (not shown) with fixed teeth configured to intermesh with the teeth of the drive gear 924. The automated pivot arm may be selectively brought into engagement with the teeth of the drive gear 924 to selectively lock the drive gear 924 against rotation.

In some applications, the manual control mechanism may have sufficient internal resistance to prevent unintended movement, and therefore may not benefit from a locking mechanism. For example, there may sufficient friction between the carriage and the carriage channel to prevent the carriage from moving without manually applied force. As another example, there may be sufficient friction between the shaft and the shaft supporting structure to prevent unintended carriage movement.

The power supply may include an LED 830a and 830b or other form of feedback to inform the user when the primary 814a and 814b is sufficiently aligned with the secondary (not shown). For example, each station 802a and 802b may include an LED 830a and 830b that becomes increasingly brighter as the primary 814a and 814b and corresponding secondary (not shown) come into increasingly greater alignment. In this embodiment, the user can turn the control knob 810a and 810b until the brightest LED position is found. Alternatively, each station 802a and 802b may include an LED 830a and 830b that illuminates once the primary 814a and 814b is in sufficient alignment with the secondary (not shown). The power supply 800 may provide other forms of feedback, such as audible or haptic feedback, to indicate alignment or the degree of alignment between the primary and the secondary. A feedback mechanism may alternatively or additionally be included in the remote device 910. For example, the remote device 910 may provide visual, audible or haptic feedback to indicate alignment or the degree of alignment between the primary and secondary. With remote devices 910 that have a display screen, the remote device 910 may be programmed to provide visual feedback using the screen.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular. The present invention is disclosed through the description of various alternative embodiments. Unless otherwise expressly noted, alternative and optional features and components disclosed in the context of one embodiment may be incorporated into other embodiments even if not expressly noted.

The invention claimed is:

1. A wireless power supply system for wirelessly supplying power to a remote device comprising:
   a power supply circuit;
   a primary electrically coupled with said power supply circuit, said primary capable of generating an electromagnetic field in response to power supplied by said power supply circuit;
   a wireless power supply surface, said surface disposed within said electromagnetic field and adapted to support a remote device within said electromagnetic field;
   a hidden movable carrier mounted adjacent said surface, said primary carried by said carrier, wherein said movable carrier is selectively movable along only one axis;
   an indicator located on or adjacent said wireless power supply surface readily visible to a user; and
   a control located on or adjacent said wireless power supply surface for manually adjusting the position of said carrier along said one axis and consequently said primary with respect to said surface, whereby said primary may be selectively moved into improved alignment with a secondary in a remote device placed on said surface to provide improved coupling between said primary and the secondary, wherein in response to selective movement of said primary into alignment with said the secondary, said indicator indicates alignment of said primary and said secondary.

2. The system of claim 1 wherein said indicator located on or adjacent said wireless power supply surface provides feedback indicative of a degree of alignment between said primary and the secondary in the remote device.

3. The system of claim 1 wherein said control is further defined as an actuator for linearly moving said movable carrier with respect to said surface.

4. The system of claim 1 wherein said control includes a rack and pinion assembly.

5. The system of claim 4 wherein said movable carrier is coupled to said rack, and wherein said control includes a knob coupled to said pinion, whereby rotation of said knob results in linear movement of said movable carrier.

6. The system of claim 2 wherein said feedback indicator includes a light.

7. The system of claim 1 wherein said surface is further defined as an inclined surface; and
   further including a remote device support disposed toward a bottom of said inclined surface;
   wherein said hidden movable carrier is configured to adjust for alignment with a plurality of remote devices each having a secondary in a different position.

8. A wireless power supply system comprising:
   a charging surface for supporting a remote device with a secondary, the secondary being capable of being located in different positions with respect to said charging surface;
   a hidden movable carrier disposed adjacent said charging surface, wherein said movable carrier is selectively movable along only one axis;
   a primary supported on said carrier;
   power supply circuitry for supplying power to said primary;
   an indicator located on or adjacent said charging surface visible to a user; and
   a manual carrier movement mechanism located on or adjacent said charging surface, said carrier movement mechanism providing selective movement of said carrier along said one axis with respect to said charging surface, wherein said carrier may be manually adjusted to provide optimal alignment between said primary and the secondary of the remote device, wherein in response to selective movement of said primary into improved alignment with said the secondary, said indicator indicates charging to a user.

9. The system of claim 8 further including a locking mechanism selectively movable into a locking position to lock said carrier is a fixed position to resist unintended movement of said carrier.

10. The system of claim 8 wherein said movable carrier is capable of movement along a single line of motion, said movement mechanism permitting selective movement of said carrier along said single line of motion.

11. The system of claim 10 wherein said indicator located on or adjacent said wireless power supply surface provides an indication of the degree of alignment between said primary and the secondary of the remote device.

12. The system of claim 11 further including a locking mechanism selectively movable into a locking position to lock said carrier in a fixed position to resist unintended movement of said carrier.

13. The system of claim 8 wherein said movable carrier is capable of movement along at least two different degrees of freedom, said movement mechanism permitting selective movement of said carrier along each of said degrees of freedom.

* * * * *